(12) United States Patent
Vacek

(10) Patent No.: US 11,982,466 B2
(45) Date of Patent: May 14, 2024

(54) SYSTEMS AND METHODS FOR CONTROLLING AIR PROPERTIES IN STRUCTURES AND INHIBITING MOISTURE ACCUMULATION AND MOLD PROPAGATION IN STRUCTURES

(71) Applicant: VACEK LLC, Porter, TX (US)

(72) Inventor: Sam S. Vacek, Porter, TX (US)

(73) Assignee: Vacek LLC, Porter, TX (US)

(*) Notice: Subject to any disclaimer, the term of this patent is extended or adjusted under 35 U.S.C. 154(b) by 69 days.

(21) Appl. No.: 17/556,527

(22) Filed: Dec. 20, 2021

(65) Prior Publication Data

US 2022/0170650 A1 Jun. 2, 2022

Related U.S. Application Data

(63) Continuation-in-part of application No. 16/273,344, filed on Feb. 12, 2019, now Pat. No. 11,248,814.

(51) Int. Cl.
*F24F 7/04* (2006.01)
*F24F 7/00* (2021.01)

(52) U.S. Cl.
CPC .......... *F24F 7/04* (2013.01); *F24F 2007/001* (2013.01); *F24F 2007/004* (2013.01)

(58) Field of Classification Search
CPC .. E04B 1/7069; E04B 1/72; F24F 7/10; F24F 2013/221
USPC ................. 52/302.1; 454/185, 186; 165/53
See application file for complete search history.

(56) References Cited

U.S. PATENT DOCUMENTS

| | | | |
|---|---|---|---|
| 1,443,986 | A | 2/1923 | Forcier |
| 2,264,961 | A | 12/1941 | Ward |
| 2,641,449 | A | 6/1953 | Antony |
| 3,115,819 | A | 12/1963 | Mahlmeister et al. |
| 4,013,120 | A | 3/1977 | Rheinheimer |
| 4,072,187 | A | 2/1978 | Lodge |
| 4,506,595 | A | 3/1985 | Roberts et al. |
| 4,523,516 | A | 6/1985 | Foster et al. |
| 4,580,487 | A | 4/1986 | Sosnowski |
| 5,953,883 | A | 9/1999 | Ojala |
| 5,970,623 | A | 10/1999 | Tuggle |
| 5,988,264 | A | 11/1999 | Goldsmith |
| 6,108,991 | A | 8/2000 | Hagan et al. |
| 6,279,284 | B1 | 8/2001 | Moras |
| 6,293,120 | B1 * | 9/2001 | Hashimoto ......... F28D 20/0052 165/45 |
| 6,319,115 | B1 | 10/2001 | Shingaki |
| 6,347,527 | B1 | 2/2002 | Bailey et al. |
| 6,484,417 | B2 | 11/2002 | Tedman et al. |
| 6,584,735 | B2 | 7/2003 | Burton |
| 6,705,939 | B2 | 3/2004 | Roff |
| 6,745,531 | B1 | 6/2004 | Egan |
| 6,754,997 | B2 | 6/2004 | Bonin |

(Continued)

*Primary Examiner* — Vivek K Shirsat
(74) *Attorney, Agent, or Firm* — Robert W. Strozier

(57) ABSTRACT

A structure comprises at least one outer wall having an internal wall section and an outer wall section with an air flow passage therebetween. A circulation system circulates air through the flow passage to inhibit moisture accumulation and mold growth. A sensing system determines the presence of moisture in the flow passage and generates a signal in response thereto. A controller receives the signal from the sensing system and controls the circulation system to maintain a predetermined temperature and relative humidity in the flow passage.

25 Claims, 19 Drawing Sheets

(56) References Cited

U.S. PATENT DOCUMENTS

| | | |
|---|---|---|
| 6,843,718 B2 | 1/2005 | Schmitz |
| 7,247,090 B2 | 7/2007 | Vacek |
| 8,001,736 B2 | 8/2011 | Goldberg et al. |
| 8,074,409 B2 | 12/2011 | Goldberg et al. |
| 8,316,597 B2 | 11/2012 | Goldberg et al. |
| 8,371,912 B2 | 2/2013 | Ozeki |
| 8,528,284 B2 | 9/2013 | Aspenson et al. |
| 8,713,874 B2 | 5/2014 | Bingham |
| 8,726,539 B2 | 5/2014 | Potter et al. |
| 8,813,443 B2 | 8/2014 | Goldberg et al. |
| 9,353,498 B2 | 5/2016 | Goldberg et al. |
| 9,353,516 B2 | 5/2016 | Fishburn |
| 9,702,152 B2 | 7/2017 | Sievers et al. |
| 11,248,814 B2 * | 2/2022 | Vacek ............... F24F 7/08 |
| 2003/0207663 A1 * | 11/2003 | Roff ............... A61L 9/00 454/186 |

\* cited by examiner

FIG. 1 – Prior Art

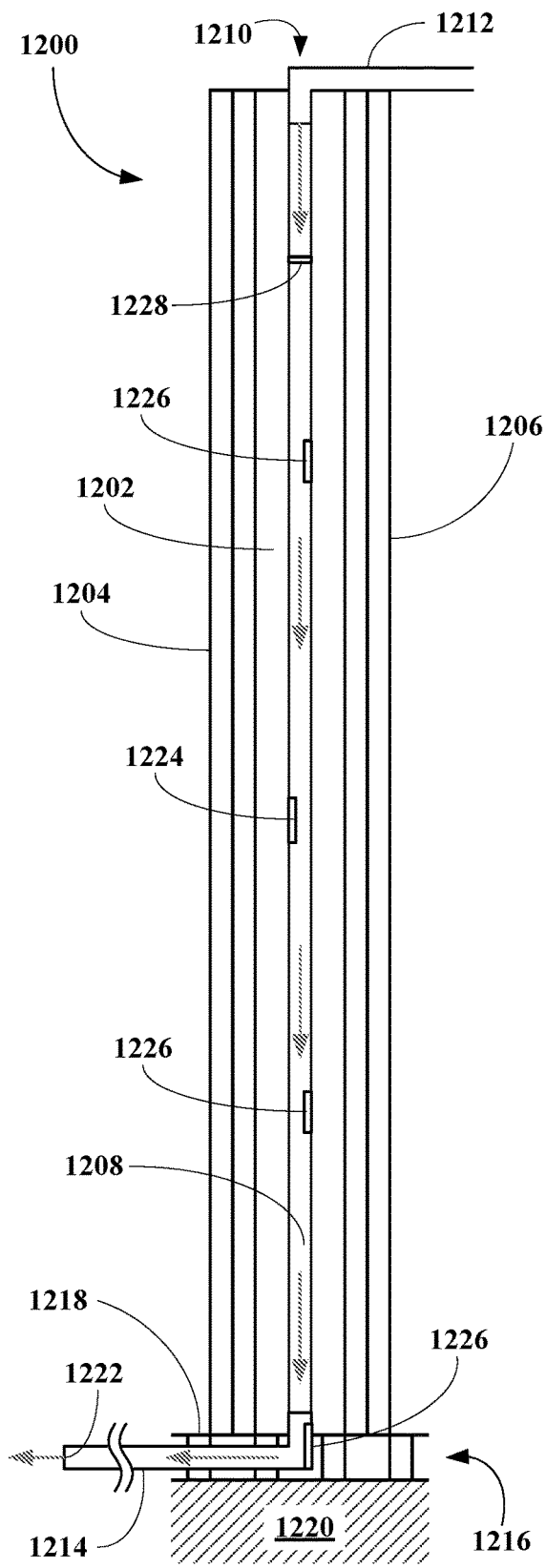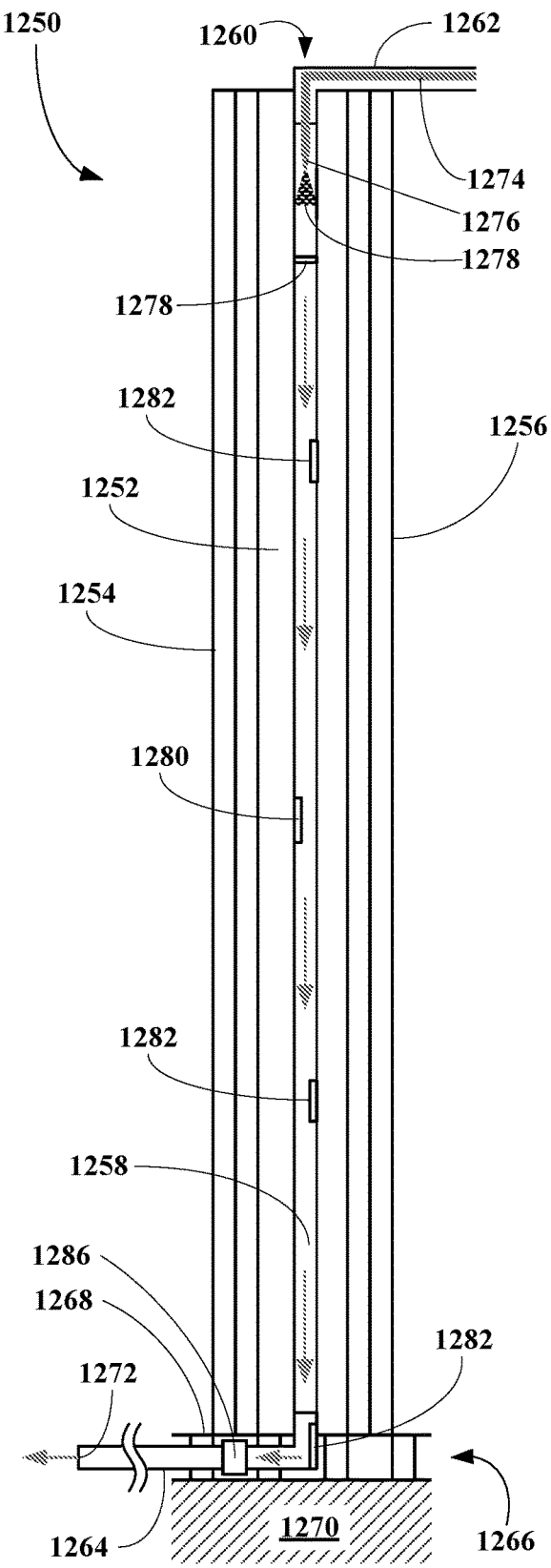
FIG. 12A  FIG. 12B

SYSTEMS AND METHODS FOR CONTROLLING AIR PROPERTIES IN STRUCTURES AND INHIBITING MOISTURE ACCUMULATION AND MOLD PROPAGATION IN STRUCTURES

RELATED APPLICATIONS

This application is a continuation of U.S. patent application Ser. No. 16/273,344 filed 12 Feb. 2019.

BACKGROUND OF THE DISCLOSURE

1. Field of the Disclosure

Embodiments of the present disclosure relate to systems, apparatuses, and methods for reducing, inhibiting, or eliminating water and/or moisture and/or their accumulation and/or mold growth in exterior walls or exterior and interior walls of habitable structures.

In particular, embodiments of the present disclosure relate to systems, apparatuses and methods for reducing, removing, inhibiting, or eliminating water and/or moisture and/or their accumulation and/or mold growth in exterior and interior walls of habitable structures, wherein the systems include air passageways or pathway supporting conditioned air through exterior walls or exterior and interior walls of habitable structures.

2. Description of the Related Art

Previously, I presented a system and method for inhibiting moisture and mold in an outer wall structure, U.S. Pat. No. 7,247,090B2. I now present improved systems, apparatuses, and methods for reducing, inhibiting, or eliminating water and/or moisture penetration and/or accumulation in internal and external walls of buildings and for drying buildings that have been subjected to flooding or other water and/or moisture penetration and/or accumulation events.

SUMMARY OF THE DISCLOSURE

Embodiments of present disclosure provide apparatuses and systems including exterior wall air passageways, optionally interior walls air passageways, and a heating, ventilation, and air conditioning unit (HVAC) that supplies conditioned air to the air passageways, valves, nozzles, and a size and a spacing of weep holes or air outlets associated with the walls and passageways or pathways to control the amount and direction of air flow into and through the passageways, wherein the conditioned air flow is designed to dry, to reduce moisture accumulation, and/or to inhibit mold growth in exterior walls or exterior and interior walls and/or to maintain a substantially uniform temperature in the structure throughout the day.

Embodiments of present disclosure provide methods of drying, inhibiting moisture accumulation, or controlling moisture in exterior and/or interior walls of a structure and/or controlling or maintaining temperature, air flow and air quality within the structure, wherein the methods include providing exterior walls or exterior and interior walls having air flow passageways therein and supplying conditioned air into the flow passageway by the HVAC unit controlled by valves and/or nozzles to dry or reduce or inhibit moisture accumulation in the walls, to maintain a certain moisture content in the walls, and/or to maintain a substantially uniform temperature in interior spaces in the structure as well as maintaining air flow and air quality in the interior spaces. The term air quality here means maintaining, in all interior spaces, air flow, moisture content, temperature, oxygen content, carbon dioxide content, carbon monooxide contents at desired levels. It should be recognized that the air passageways or pathways may include valves and nozzles for controlling air flow into the passageways or pathways and the sizes, number, and spacing of weep holes or air outlets associated with the passageways and pathways control the flow of air out of the passageways or pathways. It should also be recognized that the valves may be "active" or "passive", wherein the term passive means that the valves are one-way valves allowing flow into the passageways and pathways, but not out of the passageways or pathways, and wherein the term active means that the valves actively control the flow of air into the passageways or pathways. Again, the size, number and spacing of the passageway or pathway outlets along with valves ultimately control the air flow rate through the passageways or pathways.

BRIEF DESCRIPTION OF THE DRAWINGS OF THE DISCLOSURE

The disclosure may be better understood with reference to the following detailed description together with the appended illustrative drawings in which like elements are numbered the same:

Figure 4A:
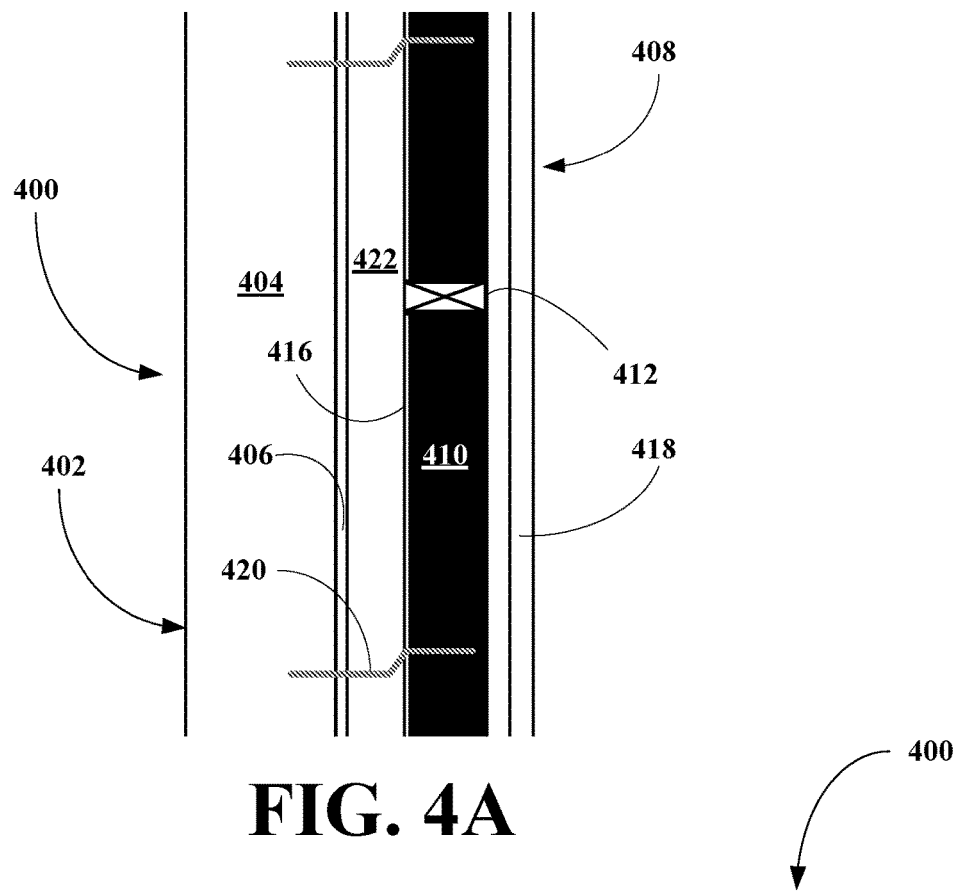

FIGS. 4A&B depict expanded views of wall embodiments of this disclosure.

Figure 5A:
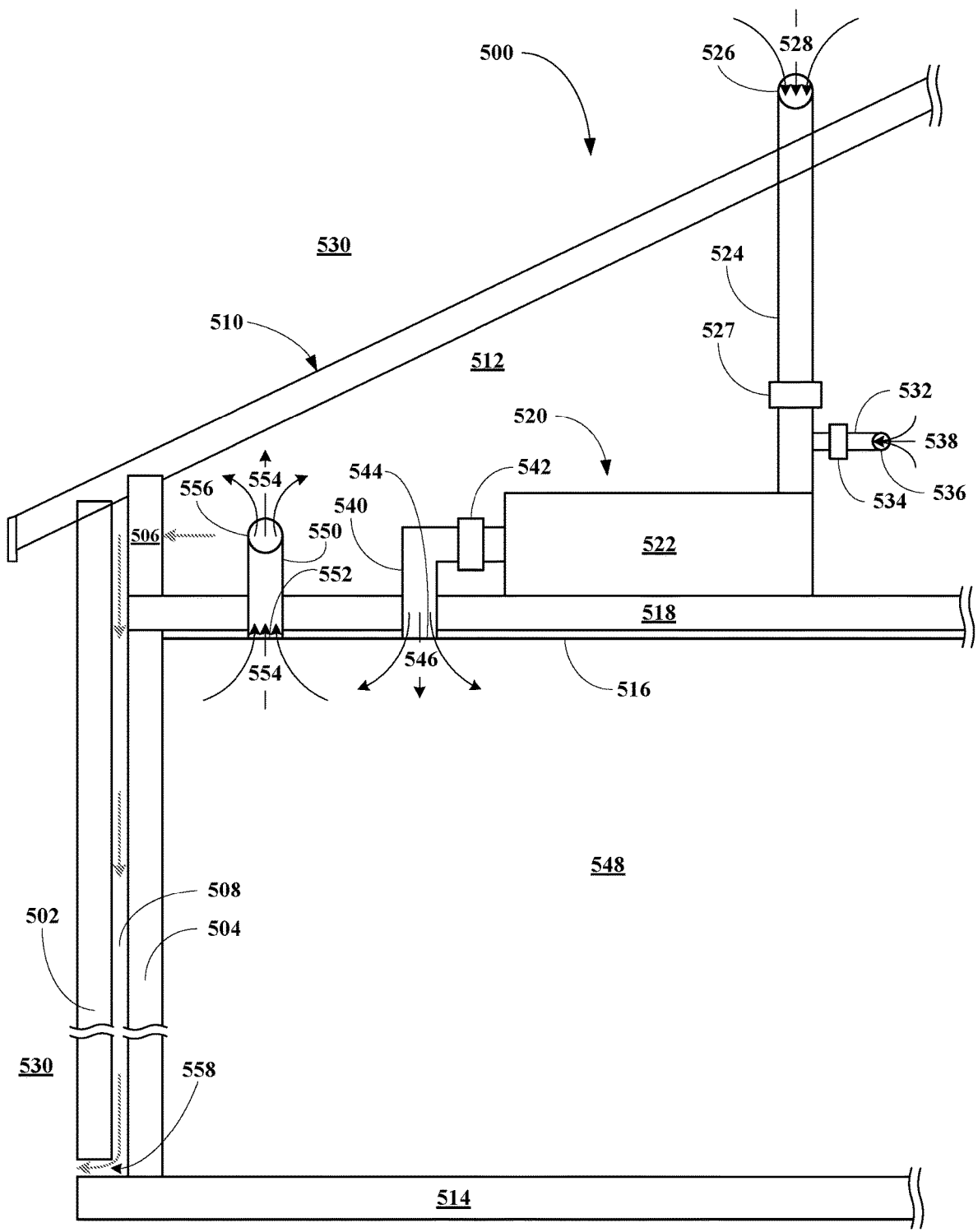

FIG. 5A depicts a third embodiment of a wall or building structure of this disclosure.

Figure 5B:
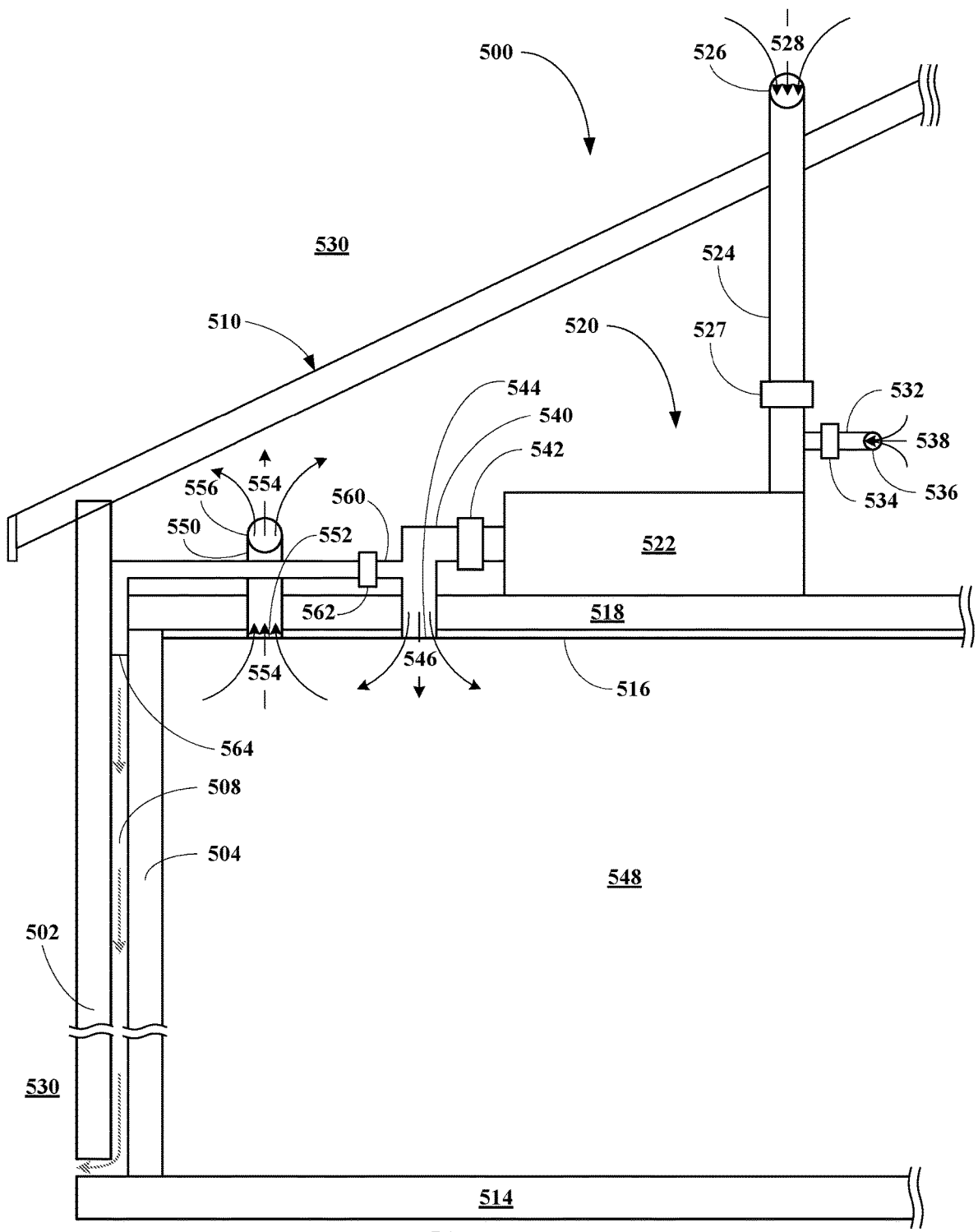

FIG. 5B depicts a fourth embodiment of a wall or building structure of this disclosure.

Figure 6A:
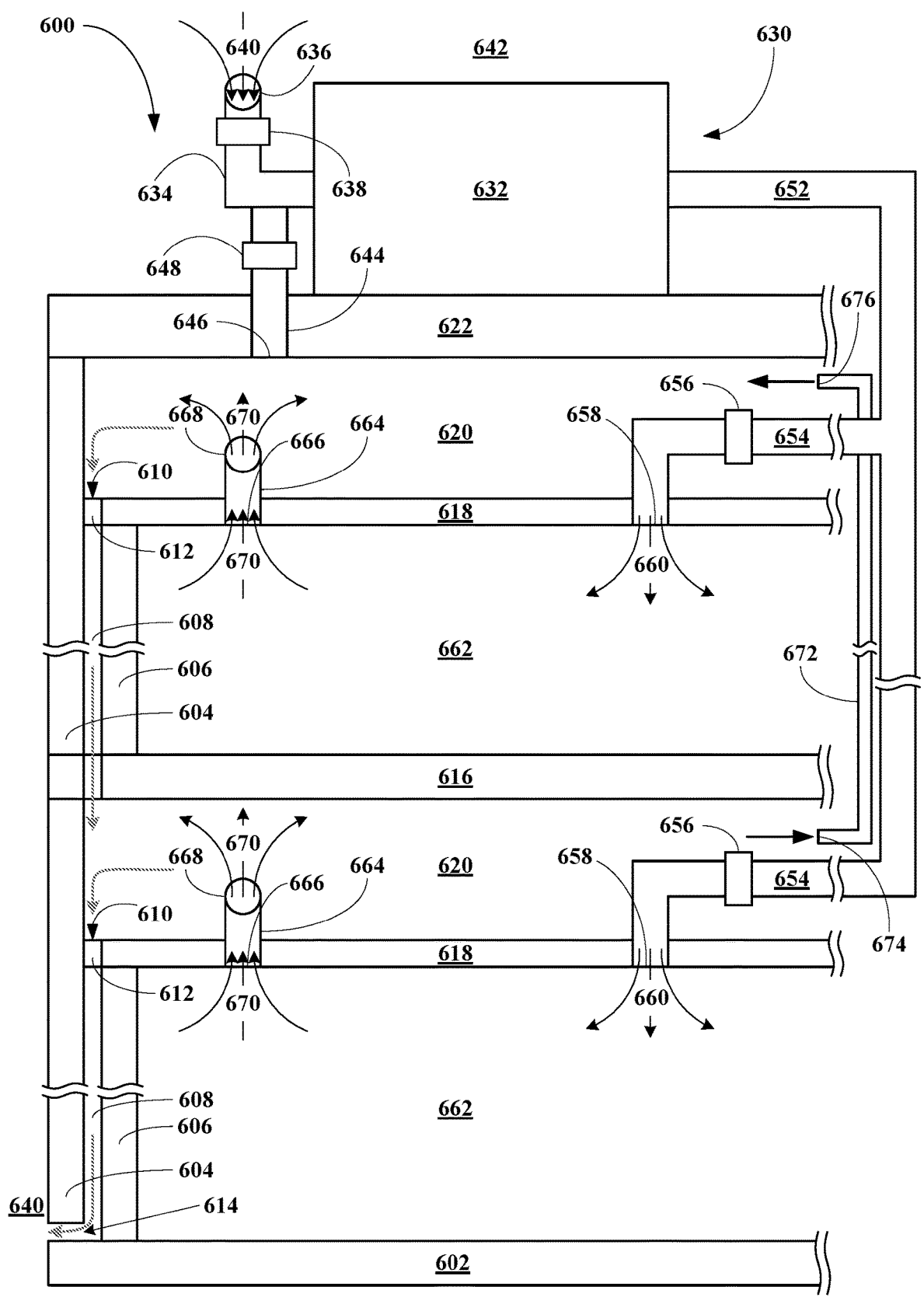

FIG. 6A depicts a first embodiment of a multistory building structure of this disclosure.

Figure 6B:
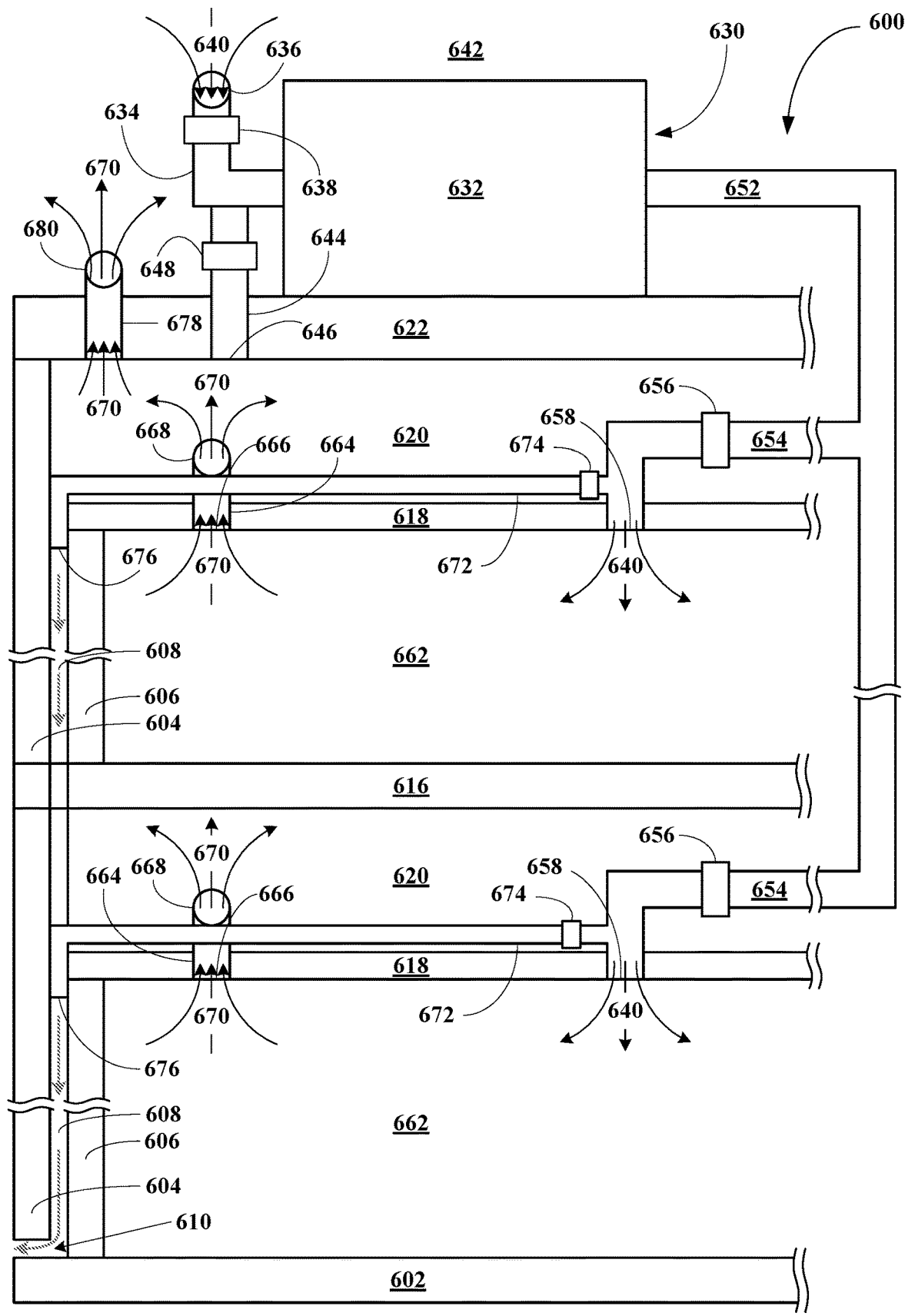

FIG. 6B depicts a second embodiment of a multistory building structure of this disclosure.

Figure 6C:
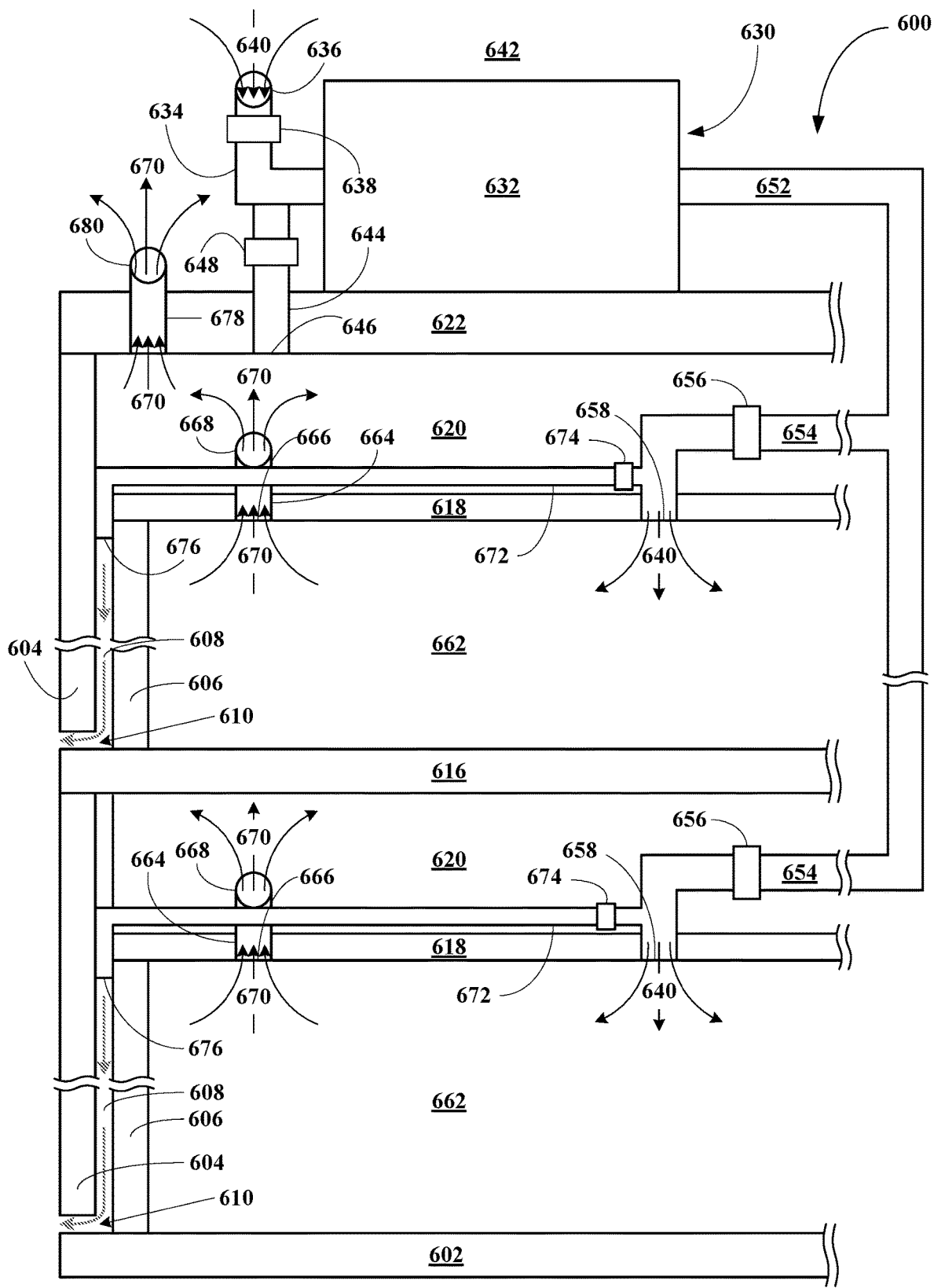

FIG. 6C depicts a third embodiment of a multistory building structure of this disclosure.

Figure 7A:
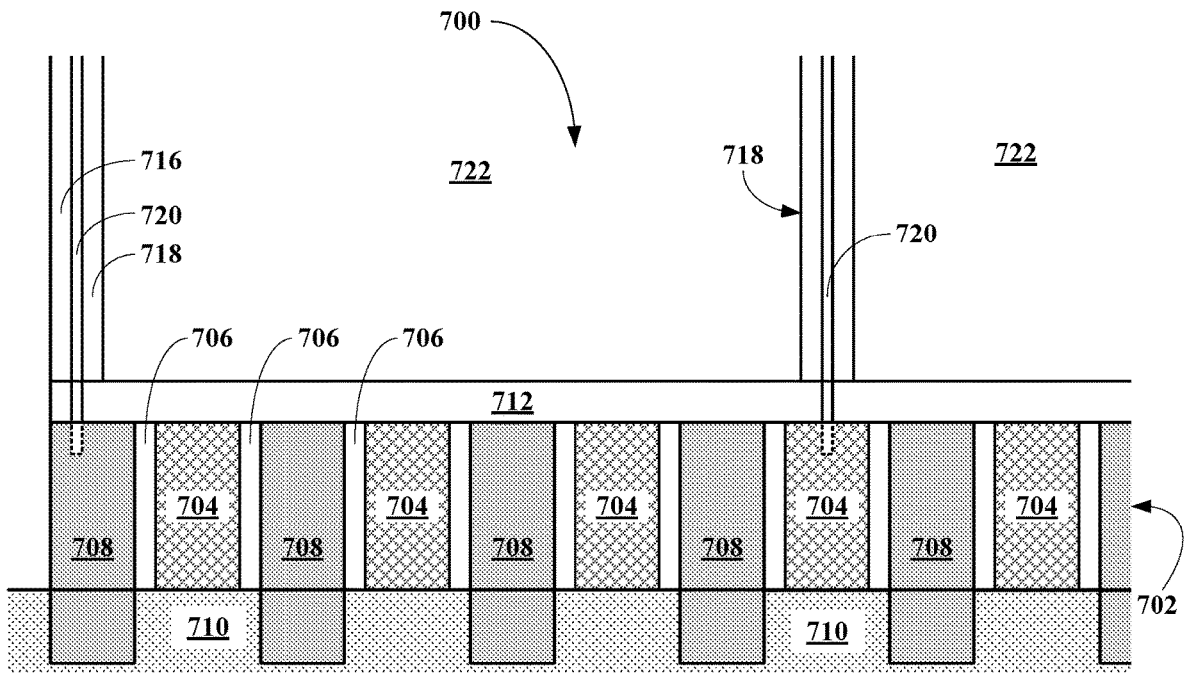
Figure 7B:
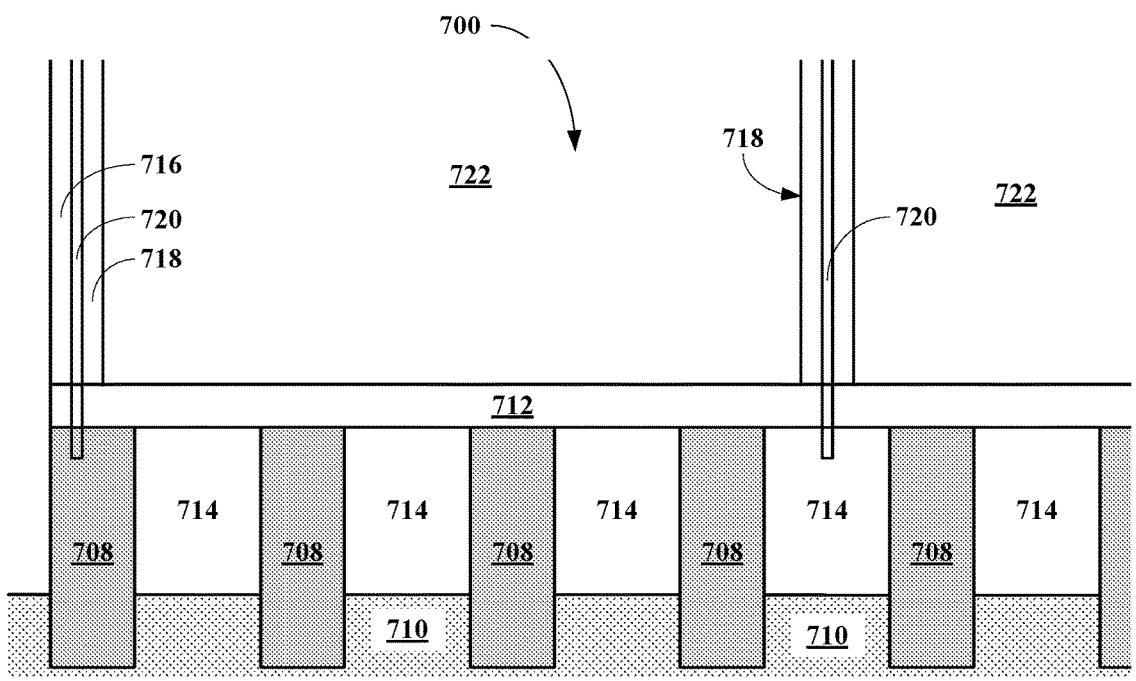

FIGS. 7A&B depict an embodiment of a peer and beam structure of this disclosure.

FIGS. 8A-D depict four embodiments of wall air distribution systems of this disclosure.

Figure 9A:
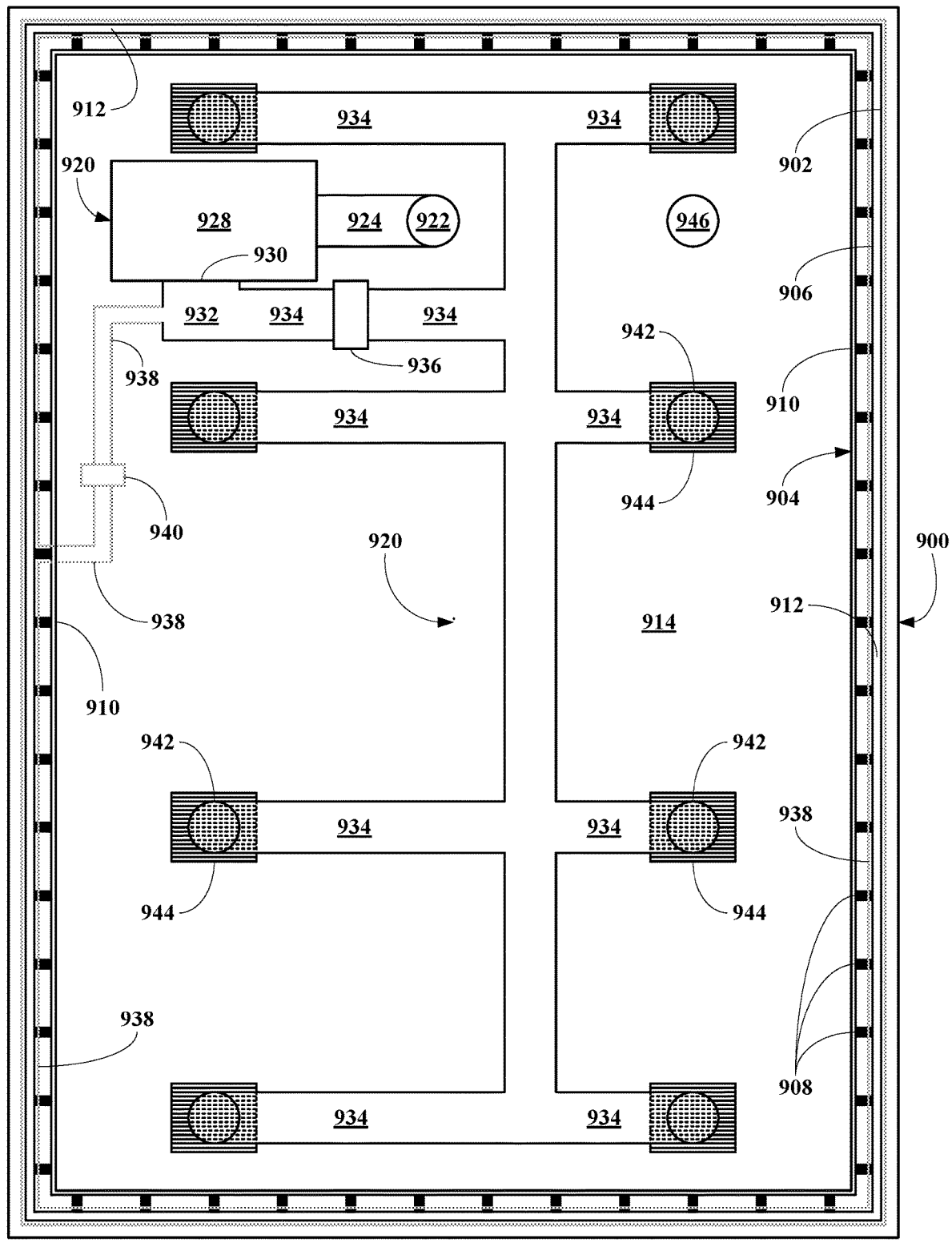
Figure 9B:
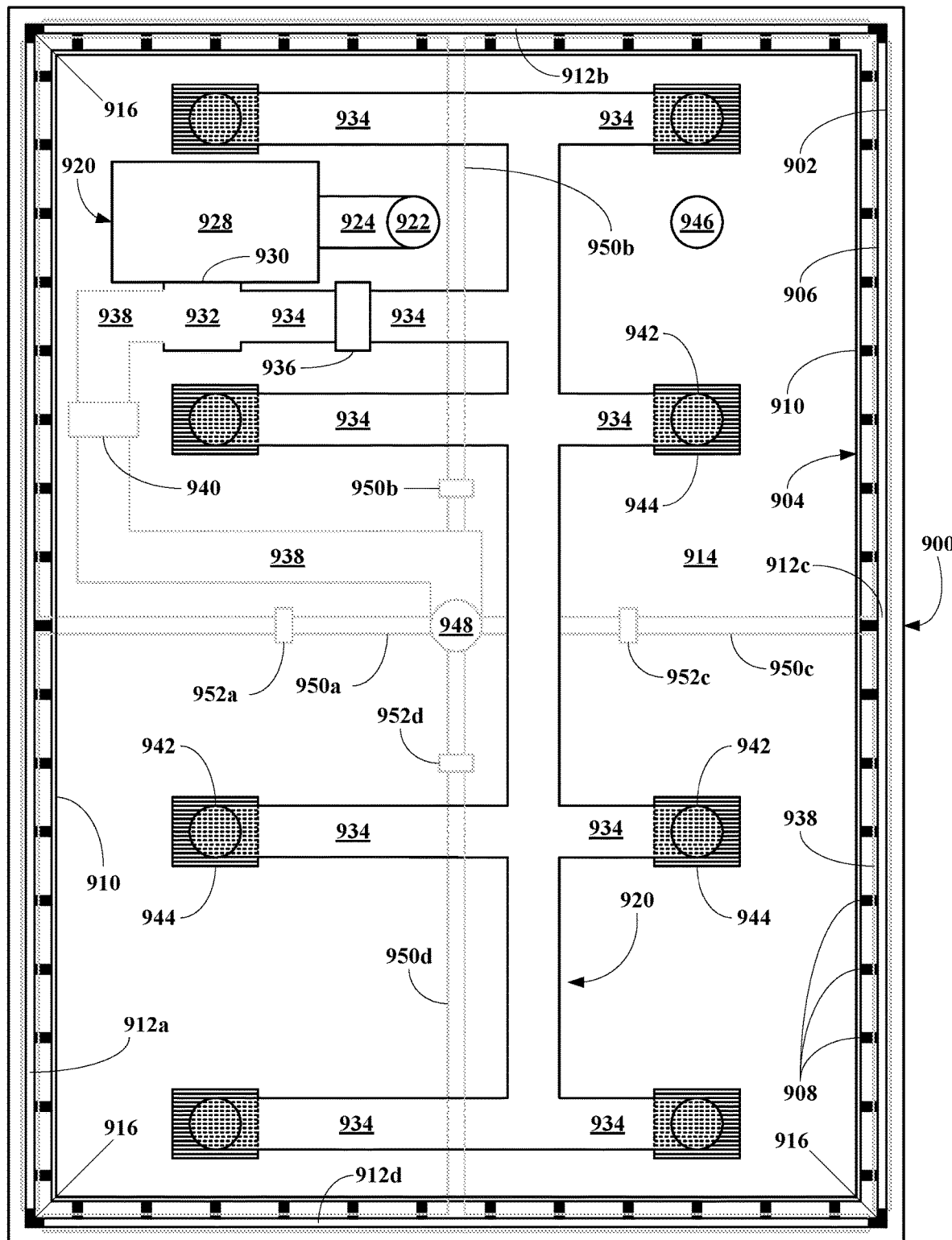
Figure 9C:
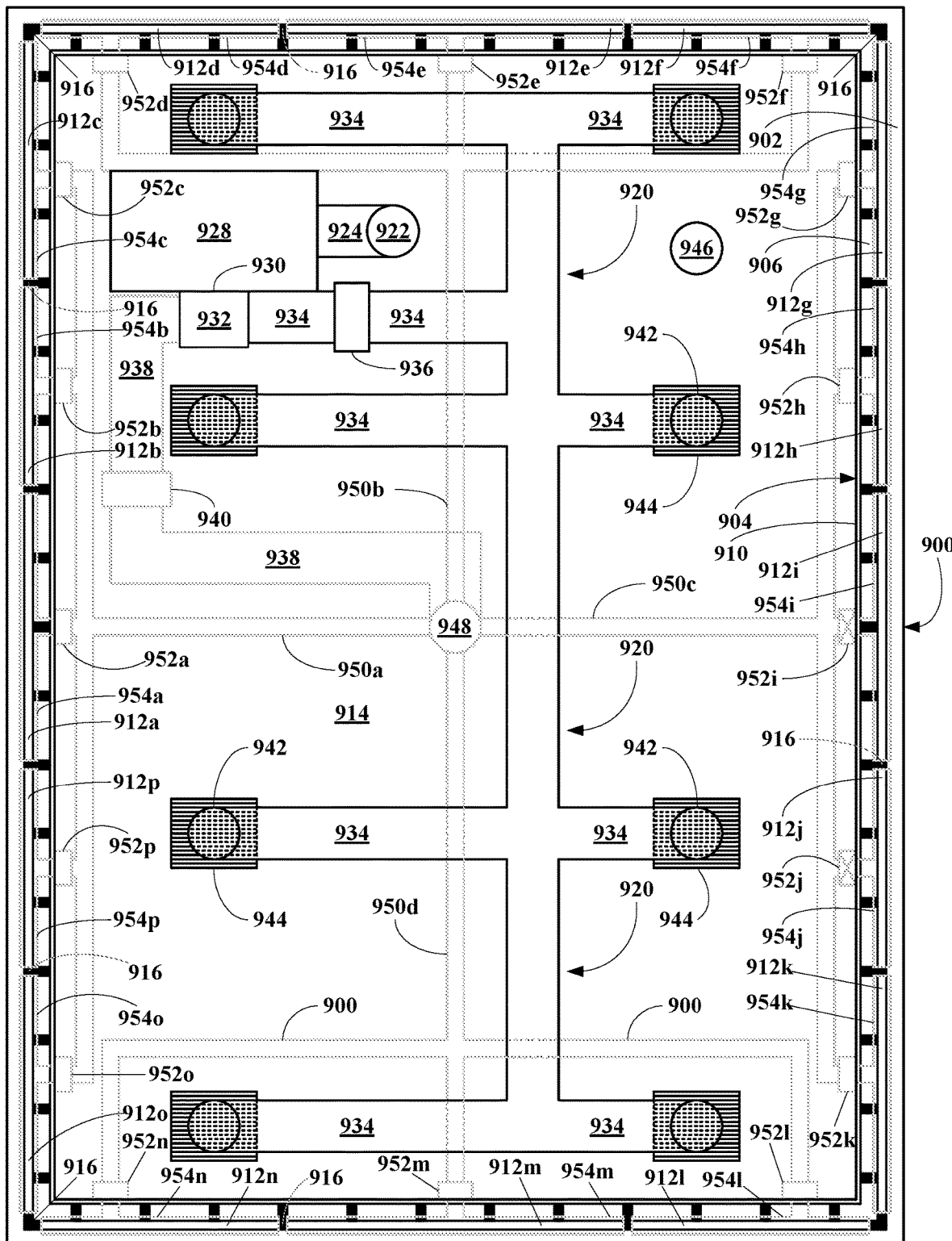

FIGS. 9A-C depict three other embodiments of wall air distribution systems of this disclosure.

Figure 10:
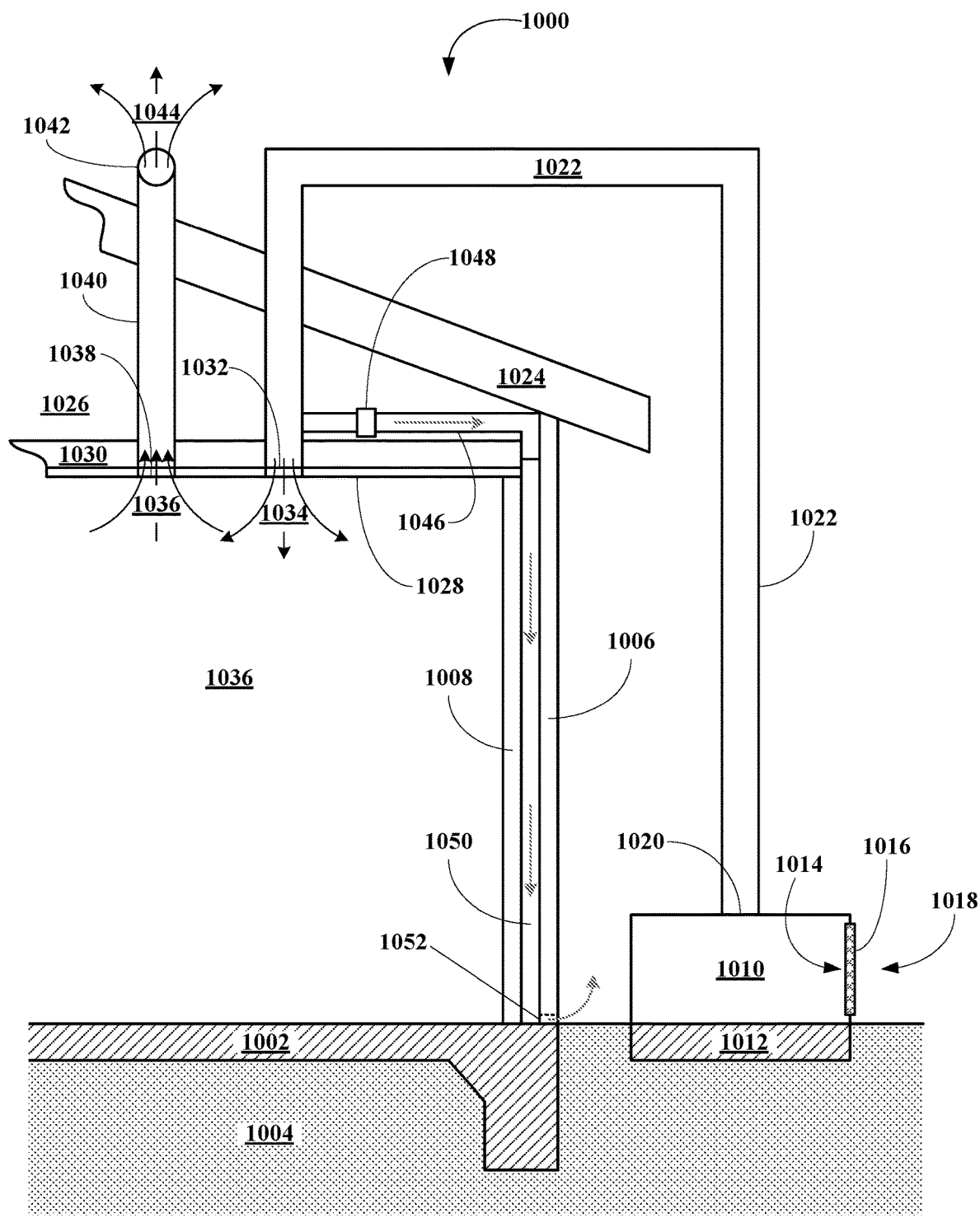

FIG. 10 depicts a fifth embodiment of a wall or building structure of this disclosure.

Figure 11A:
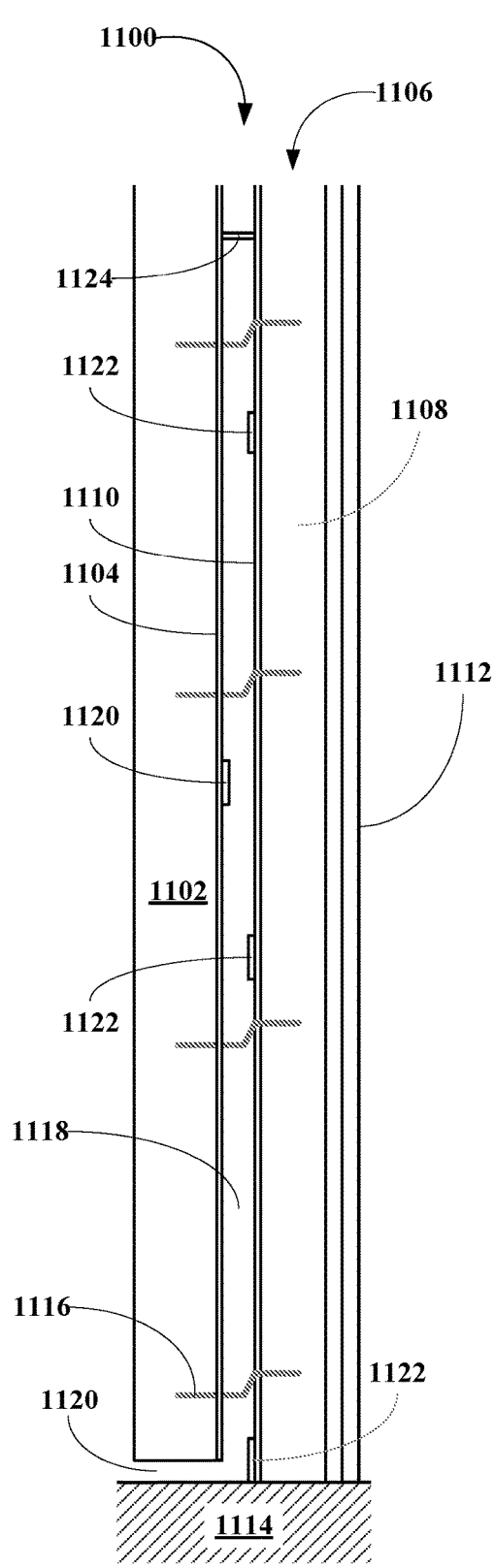

FIGS. 11A&B depict expanded views of embodiments of outer wall assemblies of this disclosure, with sensors and a sprayer.

FIGS. 12A&B depict expanded views of embodiments of outer wall assemblies of this disclosure, with sensors and a sprayer.

Figure 13:
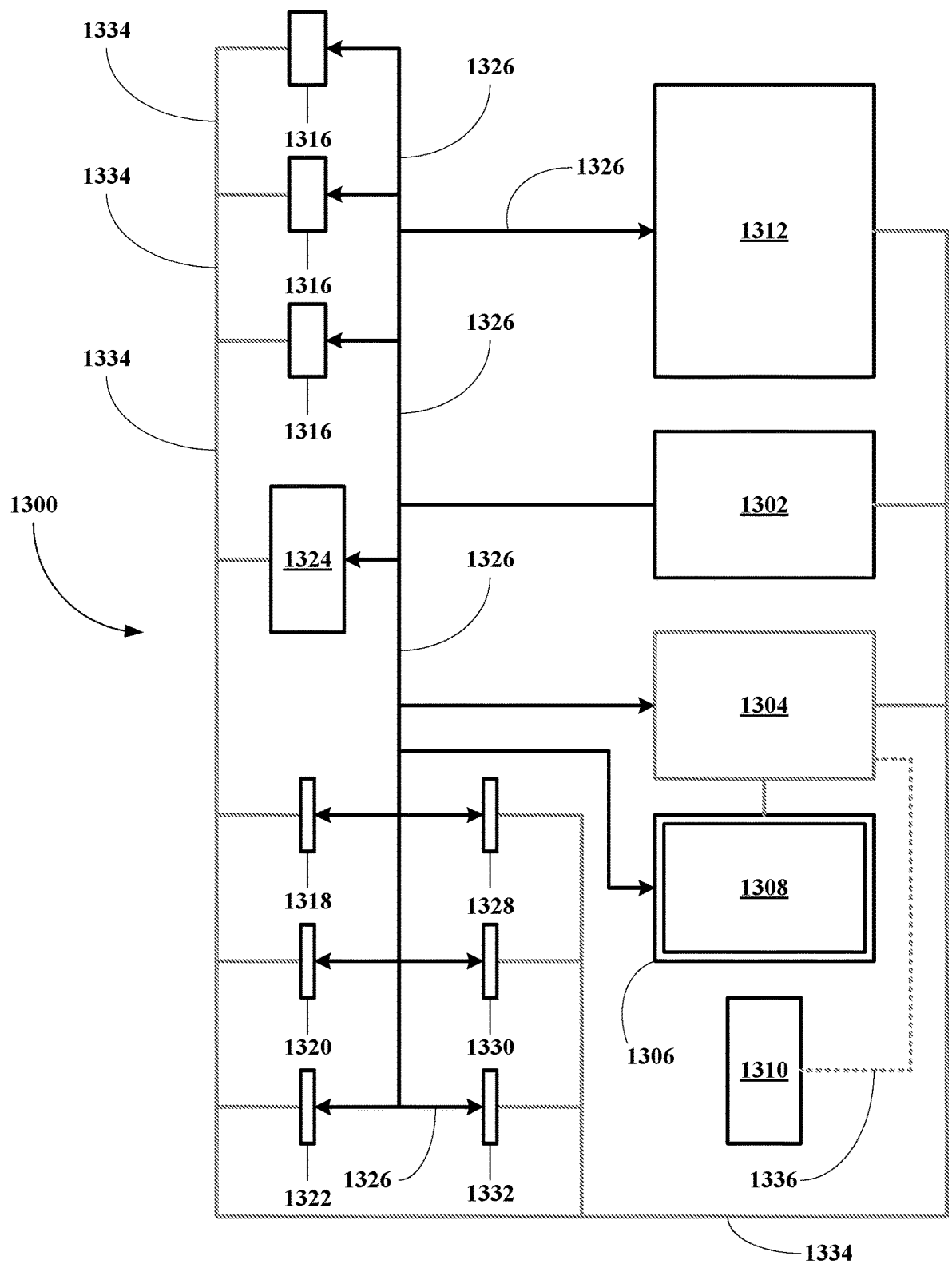

FIG. 13 depicts a control system of this disclosure.

DEFINITIONS USED IN THE DISCLOSURE

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "HVAC" means a heating, ventilation, and air conditioning unit, which generally includes a furnace, cooling coils, and blower along with the electronic and electrical components that control the unit.

DETAILED DESCRIPTION OF THE DISCLOSURE

The inventor has found that new systems, apparatuses, and methods may be constructed and implemented for reducing, inhibiting, or eliminating water and/or moisture and/or their accumulation and/or mold growth in exterior and interior walls of habitable structures by providing conditioned air pathways in the walls of the structures that are externally vented to force the removal or water and/or moisture from the walls and reduce, remove, inhibit or eliminate water and/or moisture and/or their accumulation and/or mold growth in exterior and interior walls.

Embodiments of present disclosure broadly related to apparatuses and systems including: exterior wall air passageways; optionally interior walls air passageways; a heating, ventilation, air conditioning unit (HVAC) to supply conditioned air, and valves to control an amount and/or direction of air flowing into and through the passageways, wherein the conditioned air flow may dry the walls, reduce moisture content in the walls, inhibit or control mold growth in the walls, and/or maintain a substantially uniform temperature in the structure throughout the day and night.

In certain embodiments, each exterior wall includes an internal wall section and an external wall section with the passageway disposed therebetween, wherein each passageway includes an inlet having a control valve or a unidirectional valve and an outlet, wherein the control valves or the unidirectional valves insure either a desired amount of air flow into the passageways or the air flow proceeds from the inlets to the outlets.

In other embodiments, each exterior wall includes an internal wall section and an external wall section with the passageway disposed therebetween, wherein each passageway includes an inlet having a control valve or a unidirectional valve and an outlet, and each interior wall includes a first wall section and a second wall section with the passageway disposed therebetween, wherein each passageway includes an inlet having a control valve or a unidirectional valve and an outlet, wherein the control valves or the unidirectional valves insure either a desired amount of air flow into the passageways or the air flow proceeds from the inlets to the outlets.

In other embodiments, the apparatuses and systems also include at least one sensor configured to sense moisture and generate a signal corresponding to the sensed moisture and a control unit configured to receive the signal from the at least one sensor and to control the HVAC and the valves to provide a conditioned air having properties to dry or reduce the sensed moisture or to maintain a certain moisture content in the walls due to the air flow into, through, and out of the passageways.

In other embodiments, the apparatuses and systems also include at least one sensor disposed in one, some, or all of the passageways and configured to sense moisture in the passageways and to generate a signal corresponding to the sensed moisture and a control unit configured to receive the signal from the at least one moisture sensor and to control the HVAC and optionally the valves to provide conditioned air and control an amount of the conditioned air into the air flow passageways, wherein the conditioned air has properties to dry the walls or to reduce the sensed moisture in the walls or to maintain a certain moisture content in the walls as the conditioned air flows into, through, and out of the passageways.

In other embodiments, the apparatuses and systems also include at least one sensor disposed in one, some, or all of the passageways and configured to sense temperature in the passageways and to generate a signal corresponding to the sensed temperature, and a control unit configured to receive the signals from the temperature sensors and to control the HVAC and optionally the valves to variably supply controlled amounts of conditioned air into the air flow passageways to maintain a constant and/or uniform temperature in the structure and/or to dry or reduce the moisture or to maintain a certain moisture content in the walls.

In other embodiments, the apparatuses and systems also include a supply unit for supplying mold control compositions or other compositions into the walls, wherein the supply unit is under the control of the control unit. In other embodiments, the apparatuses and systems also include fire suppressant units that may feed carbon dioxide or carbon dioxide foam or other fire retardant or suppression compositions.

In other embodiments, the apparatuses and systems are designed to permit conditioned air to be flow through the exterior and interior walls so that a uniform temperature and moisture content in the wall interiors may be maintained. During the day and night, the apparatuses and systems may continuously adjust rate and amount of conditioned air flowing into each passageway so that the temperature and moisture content within the interior of each wall is maintained at substantially uniform values that may be preset set or set as desired by the user. As the sun rises, one side of a structure will begin to heat differently than the non-illuminated side, the apparatuses and systems adjust the distribution of air flow so that the temperature and/or moisture content in the interior the walls and therefore throughout the entire structure may be more uniformly controlled.

Embodiments of present disclosure broadly relates to methods of drying water or moisture in exterior walls or exterior and interior walls of a structure, inhibiting moisture accumulation in the walls, or maintaining a substantially uniform temperature and/or moisture content in the wall, where the methods include providing exterior walls or exterior and interior walls having air flow passageways and supplying conditioned air into the flow passageway by an HVAC unit and valves to dry or reduce or inhibit moisture accumulation in the walls, to maintain a certain moisture content in the walls, and/or to maintain a substantially uniform temperature in the structure.

In certain embodiments, the methods further include receiving output from at least one sensor and controlling properties of the conditioned air in response thereto.

In other embodiments, the methods further include receiving output from at least one sensor, controlling properties of the conditioned air in response thereto and controlling an air flow rate into the passageways in response thereto.

In other embodiments, the methods further include supplying a treating composition into the passageways, wherein the treating composition is a mold control composition, a pesticide, an insecticide, a fungicide, a bactericide, a poison for rodents, other control compositions, or mixtures and combinations thereof.

In other embodiments, the methods also include collecting temperature data, moisture data, air flow data, pressure data, air component data, and/or other data and adjusting the air flow rate and/or amount into each passageway so that the values of each measure property may be maintained at some desired level or some pre-set level. In other embodiments, the adjusting may be in conjunction with data indicating a fire or other emergency situation in which case the air flow and fire suppressants and/or retardants flow rate into the passageways my be used to impede progression of the fire or to produce fire breaks, wall as that do not support fire due to air flow and flame retardant flow rate into each passageway.

Again, it should be recognized that the air passageways or pathways may include valves and nozzles for controlling air flow into the passageways or pathways and the sizes, number, and spacing of weep holes or air outlets associated with the passageways and pathways control the flow of air out of the passageways or pathways. It should also be recognized that the valves may be "active" or "passive", wherein the term passive means that the valves are one way valves allowing flow into the passageways and pathways, but not out of the passageways or pathways, and wherein the term active means that the valves actively control the flow of air into the passageways or pathways. Again, the size, number and spacing of the passageway or pathway outlets along with valves ultimately control the air flow rate through the passageways or pathways.

Embodiments of this disclosure broadly relate to structures including a floor or slab, a ceiling, an insulated roof, and an attic interposed between the ceiling and the roof. The structures further include one or a plurality of exterior walls, each of the exterior walls includes: an exterior wall outer portion, an exterior wall inner portion including a wall framing system, an exterior wall air flow passageway interposed therebetween, and at least one exterior wall exhaust conduit having: a passageway inlet, and a passage way outlet. The structures further include a plurality of interior walls and a plurality of interior spaces defined by the exterior and interior walls. The structures further include an HVAC unit, disposed in the attic, including: an HVAC air inlet conduit having: an HVAC inlet, and an HVAC inlet control valve configured to control a supply of unconditioned air or a mixture of unconditioned air and exhaust conditioned air to the HVAC unit; an HVAC air outlet conduit having: an HVAC outlet, and an HVAC outlet control valve configured to control a supply of conditioned air to the interior spaces; and at least one HVAC exhaust conduit having: an HVAC exhaust inlet, and an HVAC exhaust outlet configured to support an air flow of exhaust conditioned air into the attic. The structures further include at least one passageway control valve associated with the passageway inlets and configured to support passageway air flow into the passageway(s) and out of the exhaust conduit(s) into the surroundings and to stop air flow from the surroundings into the passageways, whereby the passageway air flow reduces, removes, and/or eliminates moisture in the exterior walls.

In certain embodiments, the at least one passageway control valve is a passive one-way or unidirectional valve, and the passageway air flow comprises attic exhaust conditioned air. In other embodiments, the at least one passageway control valve is part of the HVAC unit and is associated with a HVAC passageway outlet conduit connected to the HVAC outlet conduit and having a passageway outlet associated with the passageway inlets, the at least one passageway control valve is a passive one-way or unidirectional valve or an active control valve, and the passageway air flow comprises conditioned air from the HVAC unit. In other embodiments, each of the interior walls includes: two interior wall outer portions, an interior wall inner portion having: an interior wall air flow passageway having: a passageway inlet and a passageway outlet; at least one interior wall exhaust conduit. In other embodiments, the exterior wall inner portion includes: an insulating layer, a weather-resistant layer disposed on an outer surface of the insulating layer; and/or a sheathing disposed on an inner surface of the insulating layer. In other embodiments, the exterior wall inner portion further includes: a liquid barrier and/or a first sheathing between the liquid barrier and the wall framing system. In other embodiments, the at least one HVAC exhaust conduit further includes: a second HVAC exhaust outlet configure to support an air flow of exhaust conditioned air into the surrounding and having: an HVAC exhaust control valve configured to control amounts of exhaust conditioned air exhausted into the attic and into the surrounds.

In other embodiments, the structure further comprising: an air flow control system including: a processing unit; and plurality of sensors; wherein one, some, or all of the control valves are active control valves, wherein the processing unit is in communication with the active control valves, and wherein the processing unit is configured to: receive input from the sensors, and control the HVAC unit and the active control valves thereby controlling air flow rates into the interior spaces and into the passageways. In other embodiments, the sensors are selected from the group consisting of temperature sensors, water/moisture sensors, air flow sensors, chemical sensors, other physical sensors, and combinations thereof. In other embodiments, at least one of the sensors is disposed in: the air flow passageways or the air flow passageways and the attic and/or the interior spaces. In other embodiments, all of the control valves are active control valves, and during a 24 hour period of time, the processing unit is further configured: to adjust the air flow into each of the interior spaces and into each passageway so that one or more interior space properties and/or one or more passageway properties are maintained at desired values. In other embodiments, the one or more properties include moisture concentrations in the interior spaces and/or passageways, temperature in the interior spaces and/or passageways, or mixtures and combinations thereof. In other embodiments, the one or more properties further include pressures in the interior spaces and/or passageways, air flow rates in the interior spaces and/or passageways, sensed chemical concentrations in the interior spaces and/or passageways, and/or microbial concentrations in the interior spaces and/or passageways.

In other embodiments, the structures further comprises: a dispensing assembly associated with one, some, or all of the passageways and including: a reservoir containing a treating composition; a dispensing supply conduit having: a dispensing assembly control value, a dispensing head at its distal end, wherein the dispensing assembly control value is configured to control an amount of treating solution or gas introduced into one, some, or all of the passageways. In other embodiments, the treating composition is selected from the group consisting of a mold control composition, a pesticide, an insecticide, a fungicide, a bactericide, a rodent poison, other control compositions, a gas, a fire retardant compositions, a foam, and mixtures or combinations thereof, and the gas is selected from the group consisting of nitrogen, nitrogen enriched air, argon, haloalkanes and mixtures thereof, the haloalkanes are selected from the group consisting of iodomethane (Halon 10001); bromomethane (Halon 1001), bromochloromethane, $CH_2BrCl$ (Halon 1011), carbon tetrachloride (Halon 104), tribromofluoromethane (Halon 1103), dichlorofluoromethane (Halon 112), bromodifluoromethane (Halon 1201), dibromodifluoromethane (Halon 1202), bromochlorodifluoromethane, $CF_2ClBr$ (Halon 1211), dichlorodifluoromethane (Halon 122), bromotrifluoromethane, $CBrF_3$ (Halon 1301), tetrafluoromethane (Halon 14), 1,2-dichlorotetrafluoroethane(Halon 242), dibromotetrafluoroethane, $C_2Br_2F_4$ (Halon 2402), hexafluoroethane (Halon 2600), and mixtures thereof.

Embodiments of this disclosure multistory structures comprising: a plurality of stories, each of the stories including: a floor, a ceiling, and a dead spaces interposed therebetween. The multi-story structures further include: a plurality of exterior walls, each of the exterior walls includes: an exterior wall outer portion; an exterior wall inner portion; an exterior wall framing system; an exterior wall air flow passageway interposed between the exterior wall outer portion and the exterior wall inner portion; and at least one exterior wall exhaust conduit. The multi-story further include: a plurality of interior walls; a plurality of interior spaces defined by the exterior walls and interior walls; and an air flow control system including: a processing unit; plurality of sensors. The multi-story structures further include: an air handling system comprising: an HVAC unit; an HVAC inlet conduit including: an HVAC surroundings inlet conduit having: a surrounding inlet; and a surrounding inlet control valve configured to supply unconditioned air to the HVAC unit; a return conditioned air conduit having: a return conduit control valve configured to control an amount of exhausted conditioned air to the HVAC unit; a plurality of floor return conduits, each of the floor return conduits includes: an inlet disposed in the each of the floor dead spaces; a floor return conduit control valve configured to control an amount of exhaust conditioned air supplied to the return conduit from each of the floor dead spaces; and a main HVAC outlet conduit including; a plurality of floor outlet conduits, each of the floor outlet conduits includes: a floor outlet conduit control valve configured to control an amount of conditioned air supplied to each of the floors; a plurality of interior space outlet conduits, each of the interior space outlet conduits having: a plurality of interior space outlets, each of the interior space outlets; and an interior space outlet conduit control valve configured to control an amount of conditioned air supplied to each of the interior space outlets, wherein one, some, or all of the control valves are active control valves, wherein at one or more of the sensors is disposed in each of the interior spaces and one or more of the sensors is disposed in the passageways, wherein the processing unit is in communication with the active control valves, the HVAC unit, and the sensors, and wherein the processing unit is configured to: receive input from the sensors, and control the HVAC unit and the active control valves based on the sensor inputs, thereby controlling unconditioned air flow rates into the HVAC, interior space air flow rates from the HVAC, return air flow rates into the HVAC, exhaust air flow rate to the surroundings, and passageway air flow rates through the passageways and into the surroundings.

In certain embodiments, each of the floor return conduits further includes: at least one return air control valve configured to control an amount of the return conditioned air to the return conduit.

Embodiments of the disclosure broadly relates to methods for controlling air flow in a single story structures, wherein the method comprises: receiving, via the processing unit, output from the sensors, and adjusting unconditioned air flow rates into the HVAC, interior space air flow rates from the HVAC, return air flow rates into the HVAC, exhaust air flow rate to the surroundings, and passageway air flow rates through the passageways and into the surroundings to maintain properties within the interior spaces and/or passageways at desired values.

In certain embodiments, in the adjusting steps, the properties include temperature and relative humidity in each of the interior spaces and moisture concentration in the passageways.

Embodiments of the disclosure broadly relates to methods for controlling air flow in a multi-story structures, wherein the method comprises: receiving, via the processing unit, output from the sensors, and adjusting unconditioned air flow rates into the HVAC, interior space air flow rates from the HVAC, return air flow rates into the HVAC, exhaust air flow rate to the surroundings, and passageway air flow rates through the passageways and into the surroundings to maintain properties within the interior spaces and/or passageways at desired values.

In certain embodiments, in the adjusting steps, the properties include temperature and relative humidity in each of the interior spaces and moisture concentration in the passageways.

Suitable Components for Use in the Disclosure

Suitable treating compositions include, without limitation, mold control compositions, pesticides, insecticides, fungicides, bactericides, rodent poisons, other control compositions, gases, fire retardant compositions, foams, and mixtures or combinations thereof.

Suitable gases include, without limitation, air, nitrogen enriched air, nitrogen (all grades), argon, carbon dioxide, haloalkanes and mixtures thereof.

Suitable haloalkanes include, without limitation, iodomethane (Halon 10001); bromomethane (Halon 1001), bromochloromethane, $CH_2BrCl$ (Halon 1011), carbon tetrachloride (Halon 104), tribromofluoromethane (Halon 1103), dichlorofluoromethane (Halon 112), bromodifluoromethane (Halon 1201), dibromodifluoromethane (Halon 1202), bromochlorodifluoromethane, $CF_2ClBr$ (Halon 1211), dichlorodifluoromethane (Halon 122), bromotrifluoromethane, $CBrF_3$ (Halon 1301), tetrafluoromethane (Halon 14), 1,2-dichlorotetrafluoroethane(Halon 242), dibromotetrafluoroethane, $C_2Br_2F_4$ (Halon 2402), hexafluoroethane (Halon 2600), and mixtures thereof.

Suitable foams include, without limitation, any of the gases and compositions introduced as a foam using a foaming agent or the co-introduction of a foaming agent and a gas or treating compositions. Suitable foaming agents include all surfactants and any other material the forms a foam when combined with a gas.

Suitable flow control valves or dampers for use herein include, without limitation, control valves or dampers manufactured by Johnson Controls, Belimo, Honeywell, Siemens, Greenheck, KMC Controls, or other similar manufacturers.

Suitable sensor for use in the disclosure include, without limitation, relative humidity sensors, moisture sensors, water sensors, physical sensors such as temperature sensors, pressure sensors, air flow sensors, etc., chemical sensors such as carbon dioxide sensors, carbon monooxide sensors, oxygen sensors, etc., microbial sensors such as mold sensors, fungus sensors, bacterial sensors, viral sensors, etc., other sensors, and combinations thereof.

Suitable air flow sensors for use herein include, without limitation, E+E Elektronik, Honeywell, Siemens, IFM Electronics, Air Logic, SDT, EGE, Delta OHM, Weber, EC, or other similar manufacturers.

Suitable temperature sensors for use herein include, without limitation, Analog Devices, Mitsumi, Melexis, Environdata, Geokon, IST, SBE, Andigilog, AquiStar, Envco, STMicroelectronics, ZMD, Measurement Specialties, Microship, MicroDAQ, Smartec, Dallas Semiconductor, Slop Indicator, Honsberg, Maxim, ReGMet, GF Signet, Philips, Texas Instruments, FTDI Chip, Thermometrics, Spica Technology, or other similar manufacturers.

Suitable water/moisture sensors for use herein include, without limitation, Converge, Edyn, Oval Digital, Sengenia, Galltec, E+E Elektronik, TE Connectivity, Kurabe Industrial Co, Ltd., Scale-Tron, Measurement Specialties, Michell Instruments, EMS Brno, Hoperf Electronics, GE Sensing, Hygrosens Instruments, Sensirion, Gefran, U.P.S.I., Precon, EME Systems, FTDI Chip, IST, Blue Earth, Vishay, or other similar manufacturers.

Suitable chemical sensors for use herein include, without limitation, carbon dioxide sensors, carbon monoxide sensors, mold sensors, or other similar chemical and microbial sensors.

Suitable physical sensors for use herein include, without limitation, pressure sensors, air compositional sensors, partial pressure sensors, or other physical sensors.

Suitable processors or processing units for use herein include, without limitation, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

Suitable interfaces and interface components for use herein include, without limitation, manufactured by Microsoft, Samsung, Apple, Linex, or other similar GUI or user interfaces.

Suitable HVAC unit and associated components for use herein include, without limitation, AAON, Airedale International Air Conditioning, Amana Corporation, American Standard Companies, ASI Controls, Baxi, BDR Thermea, BELIMO Holding AG, Buffalo Forge Company, CaptiveAire Systems, Carrier Corporation, Chunlan Group, CIAT Group, Climaveneta, Coleman Heating & Air Conditioning, Comfort Systems USA, Cylon Controls Ltd., Daewoo Electronics, Daikin, Daikin Applied Americas, De Dietrich Remeha, De'Longhi, DeLclima, Electronic Temperature Instruments, Embraco, Fegyver-és Gépgyár, Fuji Electric, Fujitsu, Galanz, General Airconditioners, GlenDimplex, Goodman Global, Gree Electric, Haier, Hart & Cooley, Help-Link, Hisense, Hisense Kelon, Hitachi, J & E Hall, Jasun Filtration, Johnson Controls, Jotul, Kenstar, KMC Controls, Lennox International, LG Electronics, MarinAire, Mirgor, Mitsubishi Electric, MPF Industry Group, Panasonic, PEC Power Electric Cooperation, Petra Engineering Industries Company, Rettig ICC, Rheem, Robert Bosch GmbH, Roberts-Gordon LLC, Sampo Corporation, Sanden Corporation, Sanhua, Sanyo, Shinco, Siragon, Stelrad, Taikisha, Tatung Company, Temperzone, Thermax, Thermo King, Toshiba, Trane, Vaillant Group, Viega, Viessmann, Voltas, Walton Group, Wellman Group, Westaflex, Whirlpool Corporation, Worcester, Bosch Group, Wrightsoft, Yilida, York International, or other similar manufacturers.

DETAILED DESCRIPTION OF THE DRAWINGS OF THE DISCLOSURE

Prior Art

Figure 1:
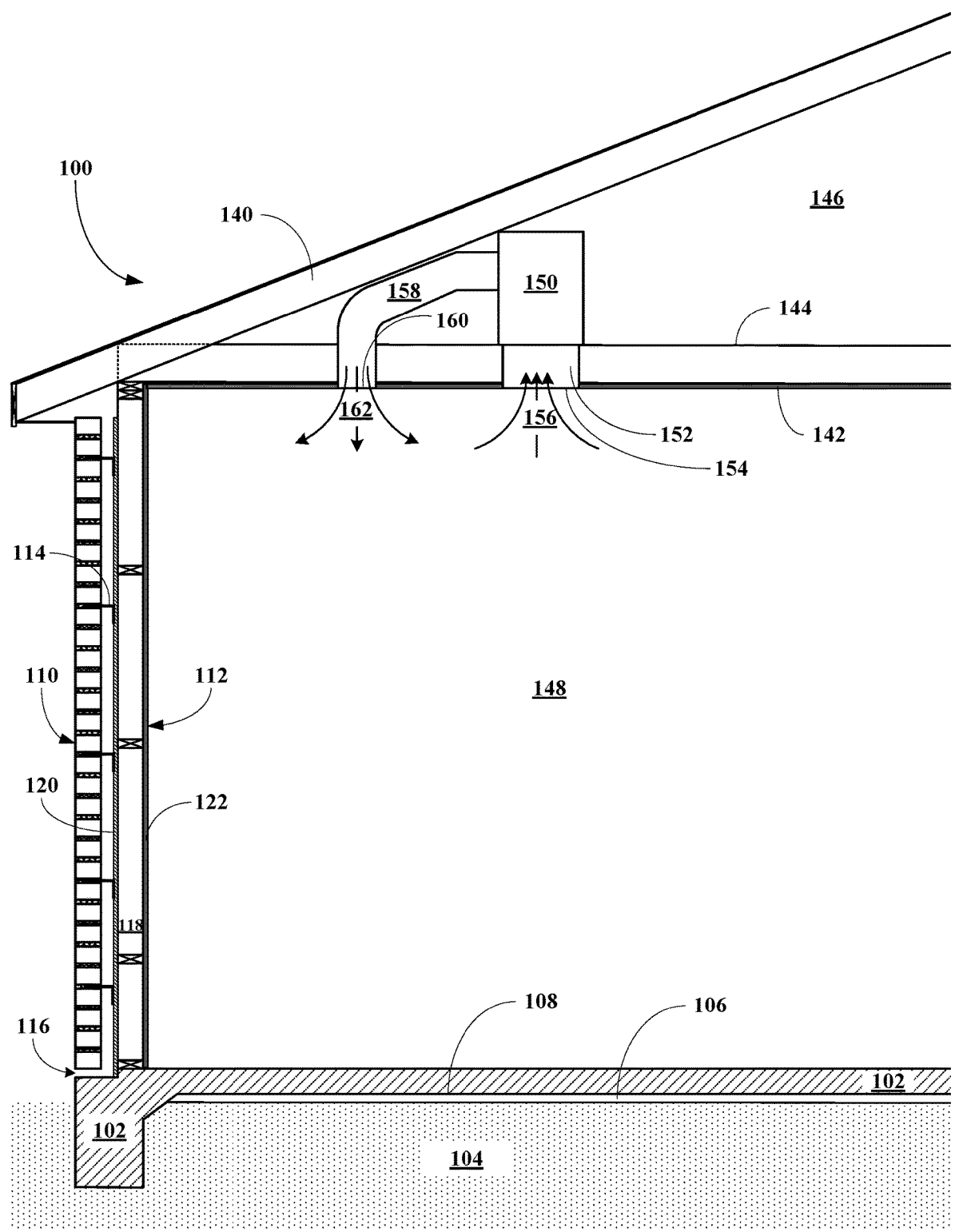
FIG. 1 depicts a prior art wall or building structure.

Referring now to FIG. 1, a prior art structure, generally 100, is shown to include a slab 102 situated on the ground 104 with a water resistant layer 106 on a bottom surface 108 of the slab 102. The structure 100 also includes an outer wall 110 (shown here as a masonry and mortar wall) anchored to an inner wall 112 via ties 114. The outer wall 110 includes weep holes 116. The inner wall 112 includes studs 118, a sheathing layer 120, and a drywall layer 122 (e.g., gypsum board or plywood) and insulation.

The structure 100 also includes a roof 140, a ceiling 142 supported by framing 144, an attic 146, and an interior 148. The structure 100 also includes an HVAC unit 150 situated in the attic 146. The HVAC unit 150 includes an inlet conduit 152 having an inlet 154 for pulling air 156 from the interior 148 into the HVAC unit 150. The HVAC unit 150 also includes an outlet conduit 158 having an outlet 160 adapted to push conditioned air 162 into the interior 148.

The structure 100 is ill equip to reduce, prevent, inhibit, or eliminate water, moisture and/or mold intrusion into exterior walls and as shown later herein, interior walls.

In U.S. Pat. No. 7,247,090B2, the inventor disclosed systems and methods for reducing water and moisture accumulation in external walls by providing a path way for conditioned air pass through the external walls and exhaust out through weep holes in the external walls. The present invention describes improved systems, apparatuses, and methods for reducing, removing, inhibiting, or eliminating water and/or moisture and/or their accumulation and/or mold growth in exterior and interior wall of habitable structures.

First Embodiment

Figure 2:
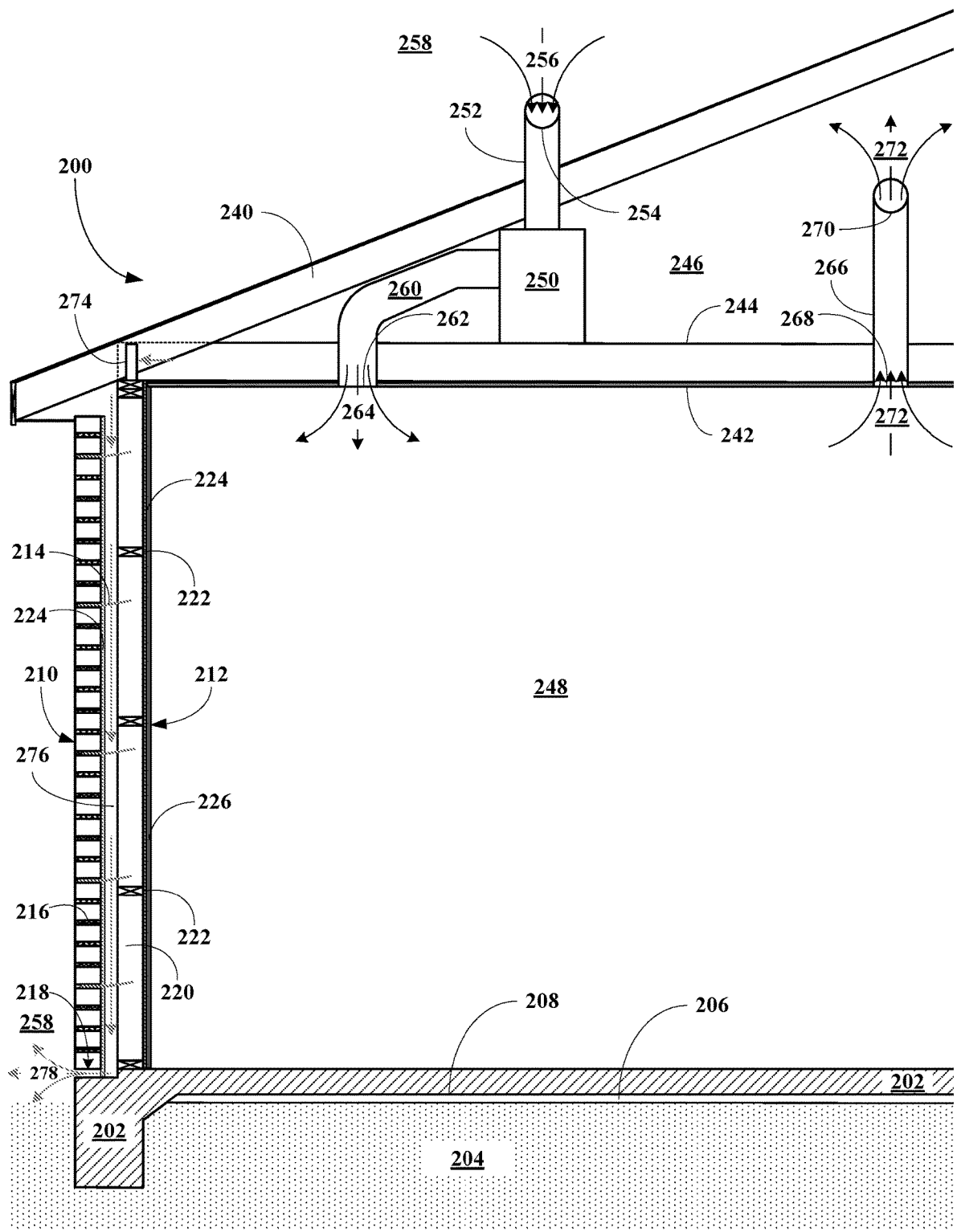
FIG. 2 depicts a first embodiment of a wall or building structure of this disclosure.

Referring now to FIG. 2, an embodiment of a structure of this disclosure, generally 200, is shown to include a slab 202 situated on the ground 204 with a water resistant layer 206 on a bottom surface 208 of the slab 202. It should be noted that the water resistant layer 206 may be disposed on the top surface of the slab 202 or both surfaces may include a water resistant layer 206. The structure 200 also includes an outer wall 210 (shown here as a masonry and mortar wall) anchored to an inner wall 212 via ties 214. The outer wall 210 includes a masonry sealer layer 216 and weep holes 218. The inner wall 212 includes studs 220, bracings between studs 222, a sheathing and/or drywall layer 224, and an optional drywall layer 226, which may be insulating or non-insulating. The ties 214 are angled up and affixed to the studs 220.

The structure 200 also includes an insulated roof 240, a ceiling 242 supported by framing 244, an attic 246, and an interior 248. The structure 200 also include an HVAC unit 250 situated in the attic 246. The HVAC unit 250 includes an inlet conduit 252 having an inlet 254, wherein the inlet 254 pulls unconditioned air 256 from the surrounding 258 into the HVAC unit 250. The HVAC unit 250 also includes an outlet conduit 260 having an outlet 262 adapted to push conditioned air 264 into the interior 248. The structure 200 also includes an outlet conduit 266 having an inlet 268 and an outlet 270, wherein the inlet 268 receives interior exhaust conditioned air 272 and the outlet 268 exhausts the interior exhaust conditioned air 272 into the attic 246. The structure 200 also includes a unidirectional valve 274 so that the exhausted conditioned air 272 flows (indicated by arrows) from the attic 246 into an air flow path 276 between the outer wall 210 and the inner wall 212 and out the weep holes 218 exhausting spent conditioned air 278 into the surrounding 258. The flow of the conditioned air from the attic through the pathways and out of the weep holes may be used to push water and/or moisture out of the walls to facilitate wall drying or to decrease/reduce or inhibit water/moisture accumulation or to decrease/reduce or inhibit mold growth in the outer wall and/or to control the moisture content in the walls.

Second Embodiment

Figure 3:
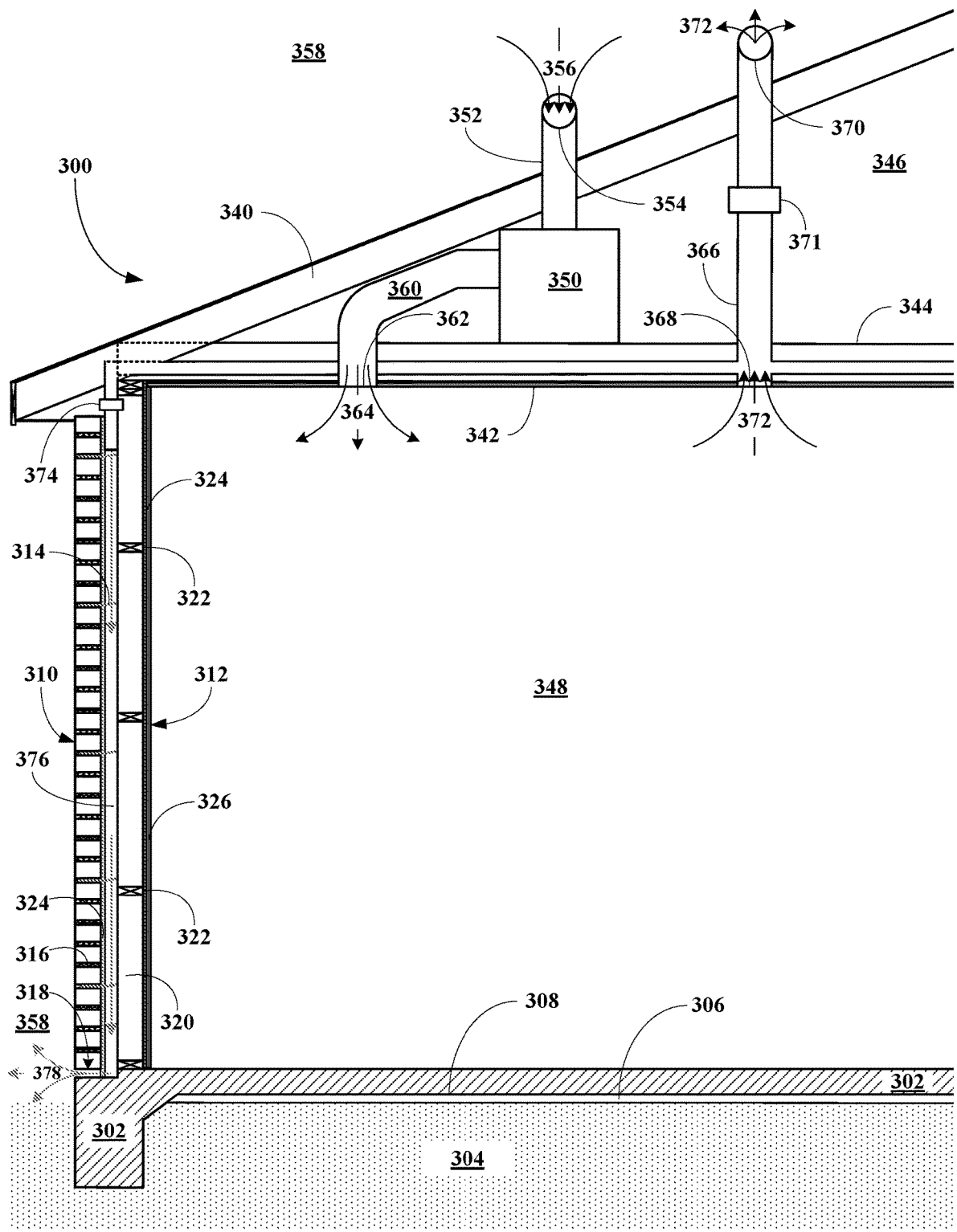
FIG. 3 depicts a second embodiment of a wall or building structure of this disclosure.

Referring now to FIG. 3, another embodiment of a structure of this disclosure, generally 300, is shown to include a slab 302 situated on the ground 304 with a water resistant layer 306 on a bottom surface 308 of the slab 302. Again it should be noted that the water resistant layer 306 may be disposed on the top surface of the slab 302 or both surfaces may include a water resistant layer 306. The structure 300 also includes an outer wall 310 (shown here as a masonry and mortar wall) anchored to an inner wall 312 via ties 314. The outer wall 310 includes a masonry sealer layer 316 and weep holes 318. The inner wall 312 includes studs 320, bracings between studs 322, a sheathing and/or drywall layer 324, and an optional drywall layer 326, which may be insulating or non-insulating. The ties 314 are angled up and affixed to the studs 320.

The structure 300 also includes an insulated roof 340, a ceiling 342 supported by framing 344, an attic 346, and an interior 348. The structure 300 also includes an HVAC unit 350 situated in the attic 346. The HVAC unit 350 includes an inlet conduit 352 having an inlet 354, wherein the inlet 354 pulls unconditioned air 356 from the surrounding 358 into the HVAC unit 350. The HVAC unit 350 also includes an outlet conduit 360 having an outlet 362 adapted to push conditioned air 364 into the interior 348. The structure 300 also includes an outlet conduit 366 having an inlet 368, an outlet 370, and a control value 371, wherein the inlet 368 receives interior exhaust conditioned air 372 and the outlet 370 exhausts the interior exhaust conditioned air 372 into the surrounding 358 and wherein the control value 371 controls the amount of air being exhausted through the outlet 370. The structure 300 may also includes a control valve 374 so that the exhausted conditioned air 370 flows (indicated by arrows) from the attic 346 into an air flow path or passageway 376 between the outer wall 310 and the inner wall 312 and out the weep holes 318 exhausting spent conditioned air 378 into the surrounding 358. However, in certain embodiments, the control valve 371 will be sufficient to direct the desired amount of conditioned air to the passageways, unless there are more than one passageways, then each passageway would include a control valve 371 that would control the air flow into each of the passageways/pathways. The flow of the conditioned air from the attic through the pathways or passageways and out of the weep holes may be used to push water and/or moisture out of the walls to facilitate wall drying or to decrease/reduce or inhibit water/moisture accumulation or to decrease/reduce or inhibit mold growth in the outer wall and/or to control the moisture content in the walls.

Expanded Views of Walls

Referring now to FIGS. 4A&B, expanded views of embodiments of an exterior wall of a structure of this disclosure, generally 400, are shown. FIG. 4A depicts an expanded cross-sectional view of the walls, while FIG. 4B depicts successive cut away elevation view of the exterior wall.

Looking at FIG. 4A, the exterior wall 400 includes an outer wall assembly 402 comprising an outer wall 404 and a sealer layer 406 and an inner wall assembly 408 comprising studs 410, bracings between studs 412, and insulation 414 (shown only in FIG. 4B), an thermal and/or moisture barrier layer 416, and sheathing and/or drywall layer 418, which may be insulating or non-insulating. The exterior wall 400 also includes ties 420 anchoring the outer wall 404 to the studs 410 or the bracings between studs 412 of the inner wall assembly 408 and an air pathway or passageway 422 disposed between the outer wall assembly 402 and the inner wall assembly 408.

Figure 4B:
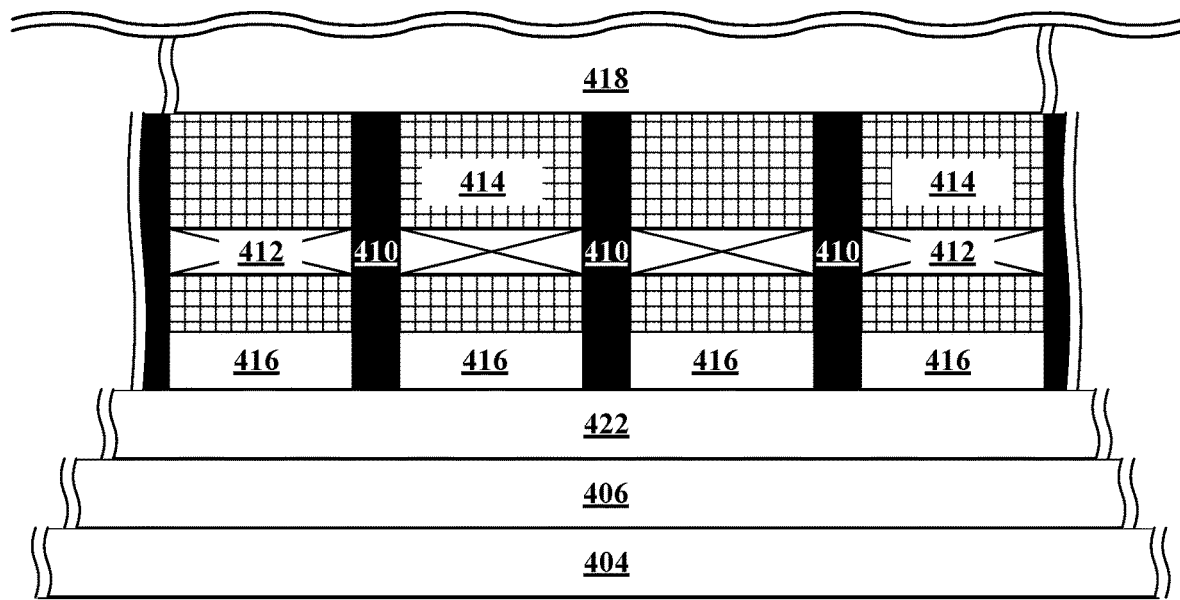

Looking at FIG. 4B, the wall 400 depicts successive cutaways showing each layer of the wall 400. The wall 400 includes the outer wall 404, then the sealer layer 406, then the air pathway 422, and then the studs 410, the bracings between studs 412, and the insulation 414. The wall 400 then include the barrier layer 416, and then the layer 418.

Third Embodiment

Referring now to FIG. 5A, another embodiment of a structure of this disclosure, generally 500, is shown to include an outer wall 502, an inner wall 504, an air flow control valve 506, an air flow pathway 508 interposed between the outer wall 502 and the inner wall 504, a roof 510, an attic 512, and a slab 514. The structure 500 includes a ceiling 516 and support framing 518.

The structure 500 also includes an air circulation assembly 520 including an HVAC unit 522 including an air intake conduit 524 having an inlet 526 and a control valve 527 for supplying unconditioned air 528 from an outside 530 to the HVAC unit 522 and an attic air conduit 532 having an air control valve 534 and an inlet 536 for supplying exhaust conditioned air 538 to the HVAC unit 522 from the attic 512. The circulation assembly 520 also includes an outlet conduit 540 having a control valve 542 and an outlet 544 for sending conditioned air 546 into an interior 548 of the structure 500. It should be recognized that the structure 500 may include a plurality of outlets 544 associated with the outlet conduit 540 for sending the conditioned air 546 into the interior 548. The circulation assembly 520 also includes an exhaust conduit 550 having an inlet 552 that withdraws exhaust conditioned air 554 from the interior 548 and an outlet 556 through which the exhaust conditioned air 554 is discharged into the attic 512. Some of the attic air 554 then exits through the control valve 506 and through the air flow pathway 508 shown by the dark grey arrows and out through weep holes or channels 558 into the outside 530.

Fourth Embodiment

Referring now to FIG. 5B, another embodiment of a structure of this disclosure, generally 500, is shown to include an outer wall 502, an inner wall 504, an air flow control valve 506, an air flow pathway 508 interposed between the outer wall 502 and the inner wall 504, a roof 510, an attic 512, and a floor 514. The structure 500 includes a ceiling 516 and support framing 518.

The structure 500 also includes an air circulation assembly 520 including an HVAC unit 522 including an air intake conduit 524 having an inlet 526 and a control valve 527 for supplying unconditioned air 528 from an outside 530 to the HVAC unit 522 and an attic air conduit 532 having an air control valve 534 and an inlet 536 for supplying exhaust conditioned air 538 to the HVAC unit 522 from the attic 512. The circulation assembly 520 also includes an outlet conduit 540 having a control valve 542 and an outlet 544 for sending conditioned air 546 into an interior 548 of the structure 500. It should be recognized that the structure 500 may include a plurality of conduits 540, control valves 542, and outlets 544 for sending the conditioned air 546 into the interior 548. The circulation assembly 520 also includes an exhaust conduit 550 having an inlet 552 that withdraws exhaust conditioned air 554 from the interior 548 and an outlet 556 through which the exhaust conditioned air 554 is discharged into the attic 512. In should be recognized that the structure 500 may also include a plurality of conduits 550, inlets 552, and outlets 556 for withdrawing exhaust error 554 from the interior 548. The system 520 also includes a wall conditioned air conduit 560 having a control valve 562 through which conditioned air shown by the dark grey arrows is discharged into the air flow pathway 508 via an outlet 564 into the pathway 508, through the pathway 508, and out through weep holes or channels 558 into the outside 530. Again, it should be recognized that the structure 500 may also include a plurality of conduits 560, valves 562, and outlets 564 associated with a plurality of pathways 508 associated with exterior or interior walls.

First Multistory Building Embodiment

Referring now to FIG. 6A, an embodiment of a multistory structure of this disclosure, generally 600, is shown to include a lower floor 602, outer/exterior wall or walls 604, inner walls 606, and air flow pathways 608 interposed between the outer wall or walls 604 and the inner walls 606, wherein the pathways or passageways 608 include inlets 610 having control valves 612 and outlet channels 614. The structure 600 also includes floors 616, ceilings 618, dead spaces 620 interposed between the intermediate floors 616 and the ceiling 618, and a roof 622. It should be recognized that the outer walls 604 may be transparent (made of glass) and the air flow passageways 608 comprise a gap between two transparent layer or panes of glass through with air may flow.

The structure 600 also includes an air circulation assembly or system 630 including an HVAC unit 632 including an unconditioned air intake conduit 634 having an inlet 636 and a control valve 638 for supplying unconditioned air 640 from an outside 642 to the HVAC unit 632 and optionally an exhaust conditioned air intake conduit 644 having an inlet 646 and a control valve 648 for supplying exhaust conditioned air 670 from the dead spaces 620 to the HVAC unit 632 via the conduits 644 and 634.

The system 630 also includes a main conditioned air conduit 652 from which floor conditioned air conduits 654 branch. Each of the floor conduits 654 include a flow control valve 656 and terminate in an outlet 658 passing through their respective ceilings 618 (only one per floor shown here, but of course, each floor will generally have a plurality of outlets 658). The floor conduits 654 discharge conditioned air 660 into interiors 662 between the floors 602 and 616 and the ceilings 618.

The system 630 also includes floor outlet conduits 664 having inlets 666 and outlets 668 for discharging exhaust conditioned air 670 into the dead spaces 620, which then progresses through the control valves 612 through the pathways 608 and out of the channels 614 into the outside 642 or through the conduits 644 and 634 to the HVAC unit 632.

The system 630 also includes a dead space return conduit 672 configured to allow exhaust conditioned air to flow from each dead space 620 with inlets 674 and an outlet 676 in the last floor dead space, wherein the return conduit 672 is configured to supply return exhausted conditioned air to the HVAC unit via the conduit 644. The return conduit 672 may include a control valve at each floor (not shown) to control the amount of air introduced into the return conduit 672 from each of the dead spaces 620.

Second Multistory Building Embodiment

Referring now to FIG. 6B, another embodiment of a multistory structure of this disclosure, generally 600, is shown to include a lower floor 602, outer/exterior wall or walls 604, inner walls 606 and air flow pathways 608 interposed between the outer wall or walls 604 and the inner walls 606 and exiting through exit channels 610. The structure 600 also includes floors 616, ceilings 618, dead spaces 620 interposed between the intermediate floors 610 and the ceiling 612, and a roof 622. Again, it should be recognized that the outer walls 604 may be transparent (made of glass) and the air flow passageways 608 comprise a gap between two transparent layer or panes of glass through with air may flow.

The structure 600 also includes an air circulation assembly 630 including an HVAC unit 632 including an unconditioned air intake conduit 634 having an inlet 636 and a control valve 638 for supplying unconditioned air 640 from an outside 642 to the HVAC unit 632 and optionally an exhaust conditioned air intake conduit 644 having an inlet 646 and a control valve 648 for supplying exhaust conditioned air 670 from the dead spaces 620 to the HVAC unit 632 via the conduit 634.

The system 630 also include a main conditioned air conduit 652 from which floor conditioned air conduits 654 branch. Each of the floor conduits 654 include flow controllers 656 and terminate in outlets 658 passing through their respective ceilings 618 (only one per floor shown here, but of course, each floor will generally have a plurality of outlets 658). The floor conduits 654 discharge conditioned air 660 into interiors 662 between the floors 616 and the ceilings 618. The system 630 also includes pathway floor outlet conduits 664 having inlets 666 and outlets 668 for discharging exhaust conditioned air 670 into the dead spaces 620.

The system 630 also includes conditioned air pathway conduits 672 including a control valves 674 and outlets 676 through which conditioned air shown in the dark gray arrows flows into the pathways 608 and then out through the channels 610.

The system 630 may also include an exhaust conduit 678 having an outlet 680 and a control valve 682 for exhausting air 670 from the dead spaces 620 to the outside 642.

Third Multistory Building Embodiment

Referring now to FIG. 6C, another embodiment of a multistory structure of this disclosure, generally 600, is shown to include in addition to the other features disclosed above, exhaust channels 610 at each floor. Of course, the exhaust channels may be also include control valves to control the rate of air being exhausted from the passageways. Additionally, the passageways may extend between floors so that the flow rate of exhausted air may be controlled floor by floor. It should be recognized that all of the multi-story structures will include a return system for returning exhaust conditioned air to the HVAC unit. Additionally, all structures may include an air circulation systems that monitors carbon dioxide, carbon monoxide, oxygen levels, humidity, and temperature, and to control the air flow into and out of the interior spaces and into and out of the passageways to maintain these properties at desirable levels.

Pier and Beam Building Embodiment

Referring now to FIGS. 7A&B, embodiment of a pier and beam structure of this disclosure, generally 700, is shown to include a pier and beam facade 702 having air vents 704 and solid portions 706 and piers 708 extending from the ground or below the ground 710 to a floor 712 and a dead space 714 between the floor 712 and the ground 710. The structure 700 also includes outer walls 716, inner walls 718, and air flow pathways or passageways 720. The structure 700 also includes interiors 722. It should be recognized that the pier and beam structure 700 may include any or all of the circulation systems, control systems, and sensor systems set forth herein. It should be recognized that there does not have to be an air vent 704 between every pair of piers 708 and the number of air vents 704 are generally a matter of design.

Embodiments Wall Air Distribution Systems

Referring now to FIGS. 8A-D, four embodiments of wall air distribution systems of this disclosure, generally 800, 830, 850, and 870, respectfully, are shown.

Figure 8A:
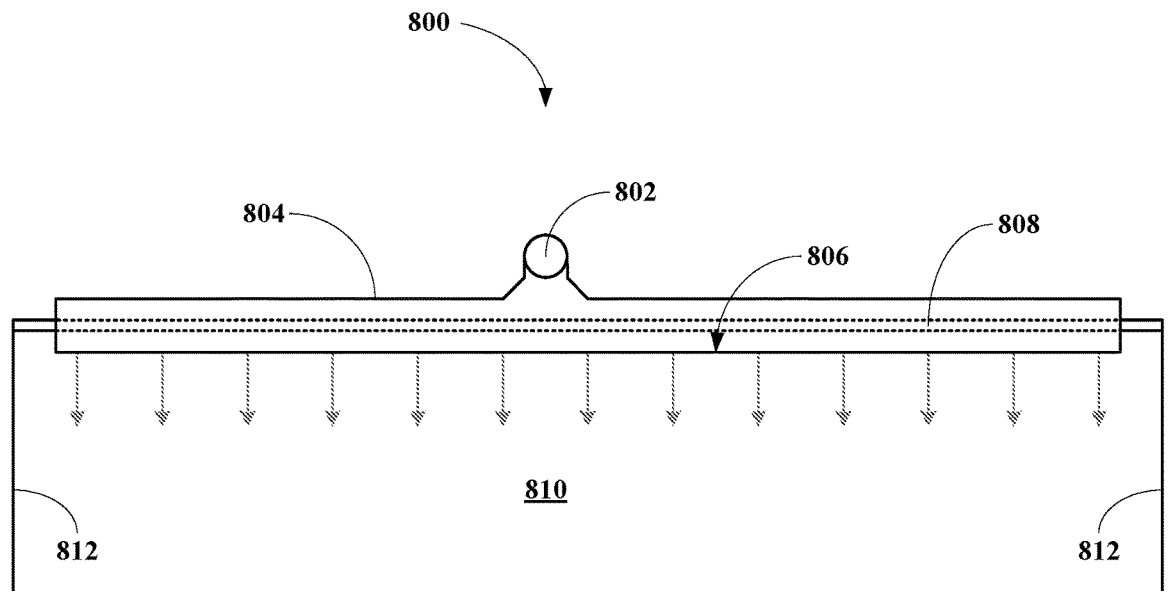

Looking at FIG. 8A, the wall air distribution system 800 includes an inlet 802, an air distribution conduit 804 having an outlet 806 that passes through a ceiling 808 and ends within an air pathway 810 disposed between an outer wall section and an inner wall section (not shown) of an interior or exterior wall 812. Conditioned air proceeds from an HVAC unit (not shown) and flows into the inlet 802 through the distribution conduit 804 and out the outlet 806 depicted by the dark gray arrows and then through the pathway 810 and out through weep holes or outlet channels (not shown), but fully described herein.

Figure 8B:
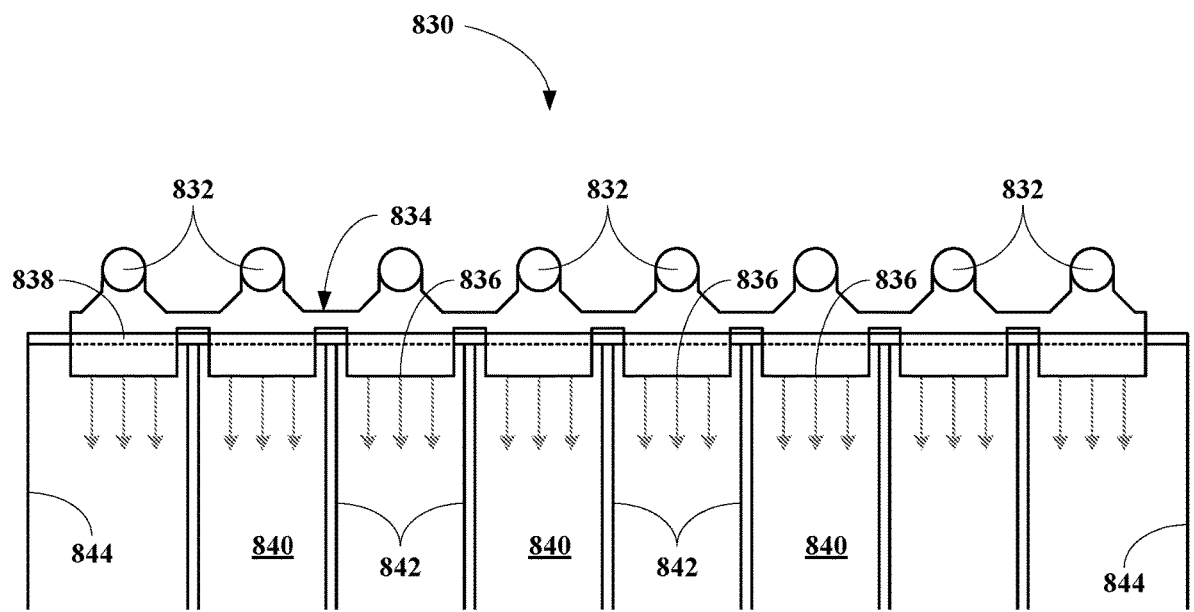

Looking at FIG. 8B, the wall air distribution system 830 includes a plurality of inlets 832, a distribution conduit 834, and a plurality of outlets 836. Each of the outlets 836 passes through a ceiling 838 and ends within one of a plurality of air pathways 840 formed by a plurality of pathway dividers 842 within an interior or exterior wall 844. The pathways 840 are disposed between an outer wall section and an inner wall section (not shown). Conditioned air proceeds from an HVAC unit (not shown) and flows into the inlets 832 through the distribution conduit 834 and out the outlets 836 and then through the pathways 840 as depicted by the dark gray arrows and out through weep holes or outlet channels (not shown).

Figure 8C:
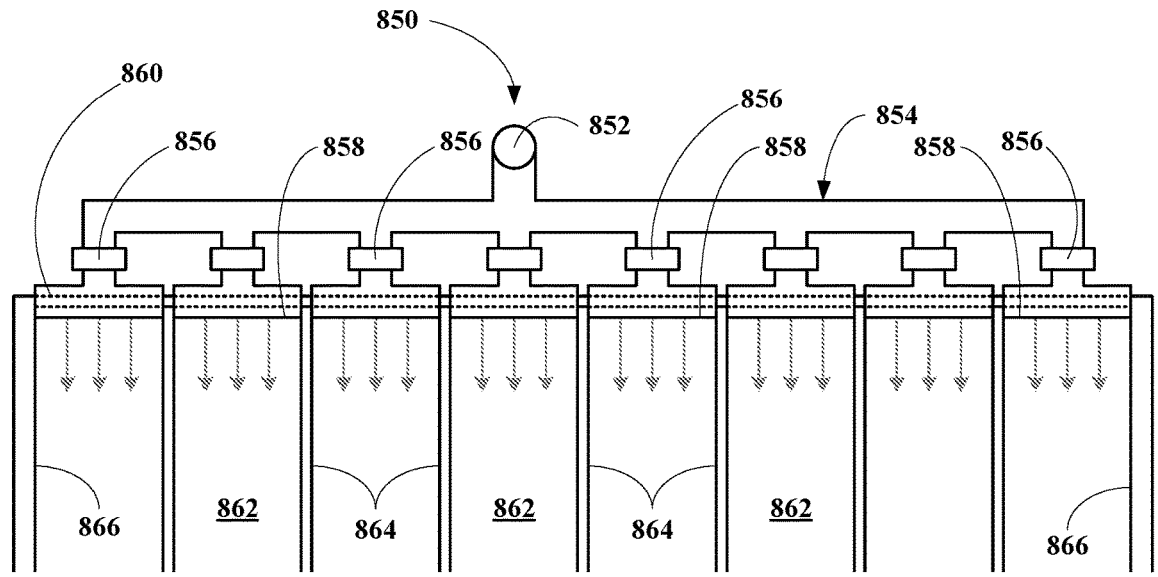

Looking at FIG. 8C, the wall air distribution system 850 includes an inlet 852, an air distribution conduit 854 having a plurality of flow control valves 856 and a plurality of outlets 858. Each of the outlets 858 passes through a ceiling 860 and ends within a plurality of air pathways 862 formed by a plurality of pathway dividers 864 within an interior or exterior wall 866. The pathways 862 are disposed between an outer wall section and an inner wall section (not shown). Conditioned air proceeds from an HVAC unit (not shown) and flows into the inlet 852 through the distribution conduit 854 and out the outlets 886 as depicted by the dark gray arrows and then through the pathways 862 and out through weep holes (not shown), where the air flow through each of the pathways 862 is controlled by the control valves 856.

Figure 8D:
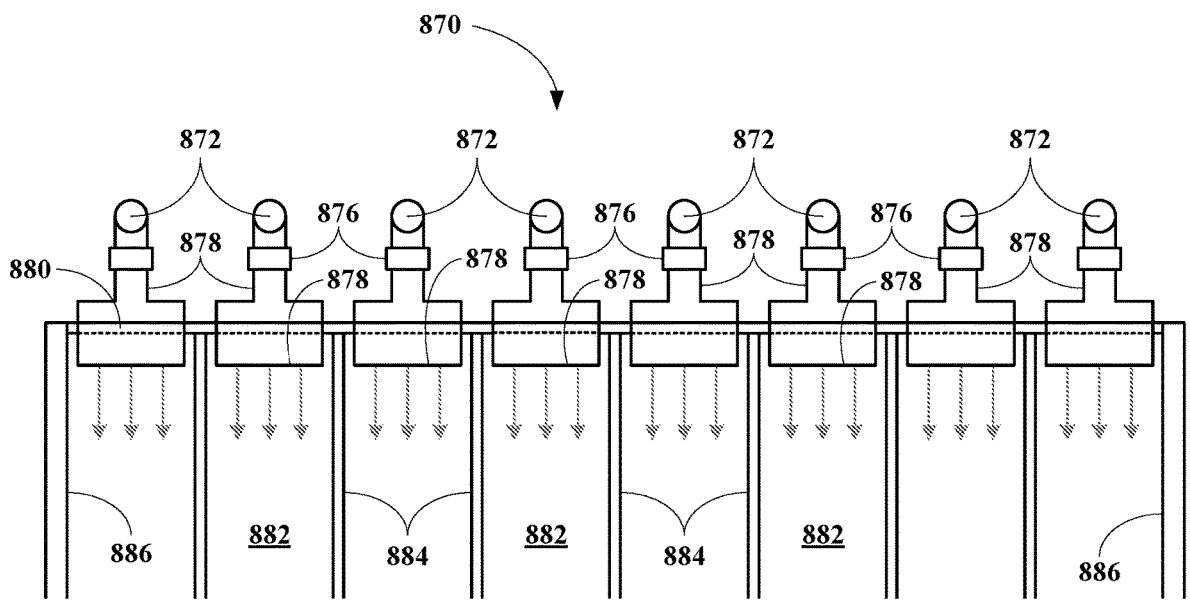

Looking at FIG. 8D, the wall air distribution system 870 includes a plurality of inlets 872, a plurality of distribution conduits 874, a plurality of flow control valves 876, and a plurality of outlets 878. Each of the outlets 878 passes through a ceiling 880 and ends within one of a plurality of air pathways 882 formed by a plurality of pathway dividers 884 within an interior or exterior wall 886. The pathways 882 are disposed between an outer wall and an inner wall of an interior or exterior wall (not shown). Conditioned air proceeds from an HVAC unit (not shown) and flows into the inlets 872 through the distribution conduits 874 and out the outlets 878 depicted by the dark gray arrows and then through the pathways 882 and out through weep holes (not shown), where the air flow through each of the pathways 882 is controlled by the control valves 876.

Embodiment Wall Air Distribution Systems

Referring now to FIG. 9A, a structure, generally 900, is shown to include an outer wall 902 and an inner wall 904 having a thermal and/or moisture barrier layer 906, studs 908, a sheathing and/or drywall layer 910, which may be insulating or non-insulating, and an air flow pathway 912 between an inner surface of the outer wall 902 and the barrier layer 906. The structure 900 also includes a ceiling 914 upon which is disposed an air conditioning and distribution assembly 920.

The assembly 920 includes an air inlet 922, an air inlet conduit 924 connected to an HVAC unit 928. The HVAC unit 928 includes an outlet 930 and an outlet conduit 932. The outlet conduit 932 splits into a main conduit 934 having a main control valve 936 and a secondary conduit 938 having a secondary control valve 940. The main conduit 934 supplies conditioned air to outlets 942 associated with registers 944 for heating or cooling an interior (not shown) of the structure 900, while the secondary conduit 938 supplies conditioned air to the air flow pathway 912 so that conditioned air may flow down the pathway 912 pushing out water and/or moisture through weep holes or drainage channels and drying the outer wall 902 and/or the inner wall 904. Of course, the same wall assembly may be used to dry out interior walls, but with different drainage and exhaust channels as described herein. The assembly 920 also includes an outlet 946 associated with an outlet conduit (not shown) for exhausting air from the interior of the structure 900 to the surroundings or to an attic or similar space associated with the structure 900.

Looking at FIG. 9B, generally 900, is shown to include an outer wall 902 and an inner wall 904 having a thermal and/or moisture barrier layer 906, studs 908, a sheathing and/or drywall layer 910, which may be insulating or non-insulating, and air flow pathways 912a-d between an inner surface of the outer wall 902 and the barrier layer 906. The structure 900 also includes a ceiling 914 upon which is disposed an air conditioning and distribution assembly 920. The pathways 912 are isolated by corner dividers 916 that prevent air exchange between the pathways 912a-d.

The assembly 920 includes an air inlet 922, an air inlet conduit 924 connected to an HVAC unit 928. The HVAC unit 928 includes an outlet 930 and an outlet conduit 932. The outlet conduit 932 splits into a main conduit 934 having a main control valve 936 and a secondary conduit 938 having a secondary control valve 940. The main conduit 934 supplies conditioned air to outlets 942 associated with registers 944 for heating or cooling an interior of the structure 900 (not shown). The assembly 920 also includes an outlet 946 associated with an outlet conduit (not shown) for withdrawing air from the interior of the structure and exhausting either to the surroundings or to an attic or similar space associated with the structure 900.

The secondary conduit 938 terminated in a distribution unit 948 that supplies conditioned air to four wall conduits 950a-d, where the conduits 950a-d include flow control valves 952a-d. The four conduits 950a-d supply conditioned air to the four pathways 912a-d so that the conditioned air may flow down the pathway 912a-d pushing out water and moisture through weep holes or drainage channels and drying the outer wall 902 and the inner wall 904. The control valve 952a-d controls the amount of conditioned air that flows into each pathway 912a-d so that each wall section may be dehydrated at different rates depending on water, moisture and/or mold content.

Of course, the same wall assembly may be used to dry out interior walls, but with different drainage and exhaust channels as described herein.

Looking at FIG. 9C, generally 900, is shown to include an outer wall 902 and an inner wall 904 having a thermal and/or moisture barrier layer 906, studs 908, a sheathing and/or drywall layer 910, which may be insulating or non-insulating, and sixteen air flow pathways 912a-p between an inner surface of the outer wall 902 and the barrier layer 906. The structure 900 also includes a ceiling 914 upon which is disposed an air conditioning and distribution assembly 920. The pathways 912a-p are isolated by dividers 916 that prevent air exchange between the pathways 912a-p.

The assembly 920 includes an air inlet 922, an air inlet conduit 924 connected to an HVAC unit 928. The HVAC unit 928 includes an outlet 930 and an outlet conduit 932. The outlet conduit 932 splits into a main conduit 934 having a main control valve 936 and a secondary conduit 938 having a secondary control valve 940. The main conduit 934 supplies conditioned air to outlets 942 associated with registers 944 for heating or cooling an interior of the structure 900 (not shown). The assembly 920 also includes an outlet 946 associated with an outlet conduit (not shown) for withdrawing air from the interior of the structure and exhausting either to the surroundings or to an attic or similar space associated with the structure 900.

The secondary conduit 938 terminated in a distribution unit 948 that supplies conditioned air to four main wall conduits 950a-d. The four main wall conduits 950a-d end in sixteen flow control valves 952a-p and feed conditioned air to sixteen air distribution conduits 954a-p that in turn supply conditioned air to the sixteen pathways 912a-p so that the conditioned air may flow down the pathway 912a-d pushing out water and moisture through weep holes or drainage channels and drying the outer wall 902 and the inner wall 904. The control valve 952a-p controls the amount of conditioned air that flows into each pathway 912a-p so that each wall section may be dehydrated at different rates depending on water, moisture and/or mold content.

Of course, the same wall assembly may be used to dry out interior walls, but with different drainage and exhaust channels as described herein.

Fifth Embodiment

Referring now to FIG. 10, an embodiment of a structure of this disclosure, generally 1000, is shown to include a slab 1002 situated on the ground 1004. The structure 1000 also includes an outer wall 1006 and an inner wall 1008. The outer wall 1006 and the inner wall 1008 may be of any type or construction. The structure 1000 also includes an outside HVAC unit 1010 disposed on an HVAC slab 1012 and including an air intake 1014 having a screen 1016 for pulling air 1018 from the surroundings into the HVAC unit 1010. The structure 1000 also includes an outlet 1020 and an outlet conduit 1022 leading through a roof 1024, through an attic space 1026, and through a ceiling 1028 supported by framing 1030 to an interior inlet 1032 from which conditioned air 1034 is discharged into an interior 1036 of the structure 1000. The structure 1000 also includes an interior outlet 1038 associated with an outlet conduit 1040 having an exhaust outlet 1042 for withdrawing air from the interior 1036 and discharging exhaust air 1044 into the attic 1026 or surrounding. The HVAC unit 1010 also includes a conditioned air wall discharge conduit 1046 including a control valve 1048 for controlling a rate and amount of conditioned air discharged into a wall pathway 1050 flows through the pathway 1048 and out exhaust holes 1052, which may be weep holes if the outer wall is masonry and mortar or just discharge channels if the outer wall is of some other construction. It should be recognized that in multistory building, the space into which the air is exhausted and that may be used to dry out walls may be any dead space including the space between floors or any other dead space that would allow air to flow through the walls and out the outlet channels. Of course, it should also be recognized that some structures the air flow may be from the bottom of the wall up especially in multistory buildings.

Expanded Views of Exterior Walls with Sensors

Referring now to FIG. 11A, an expanded view of an embodiment of an outer wall assembly of a structure of this disclosure, generally 1100, is shown to an outer wall 1102 and a sealer layer 1104 and an inner wall assembly 1106 including studs 1108, an moisture and/or vapor barrier layer 1110, an insulating sheathing and/or drywall layer 1112 situated on a slab 1114. The wall assembly 1100 also includes ties 1116 anchoring the outer wall 1102 to the studs 1108 of the inner wall assembly 1106. The wall assembly 1100 also includes an air pathway 1118 disposed between the outer wall 1102 and the barrier layer 1110. The wall assembly 1100 also includes exhaust ports, holes, or channels 1120 through which conditioned air is exits the pathway 1118.

The wall assembly 1100 also includes wall temperature sensors 1122, moisture/water sensors 1124 and an air flow rate sensor 1126. The sensors and control valves are all controlled by a controller describe more fully in FIG. 13.

Figure 11B:
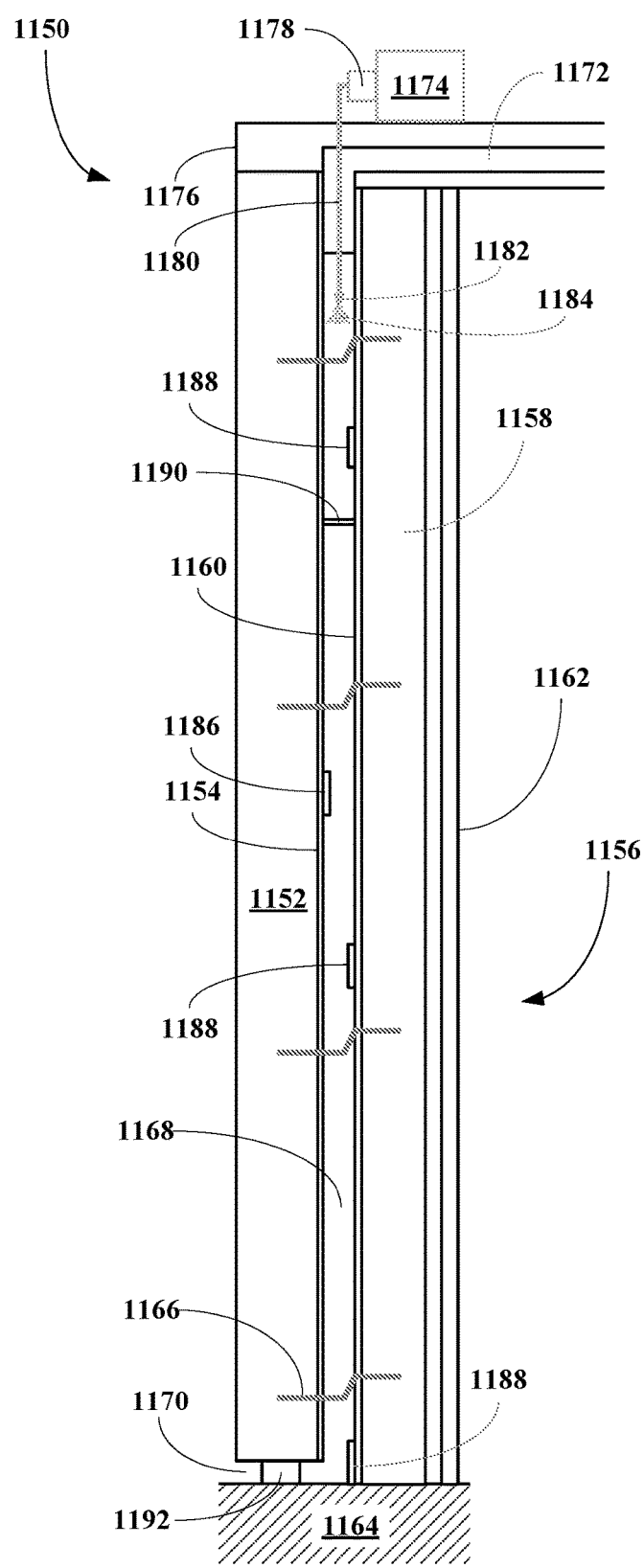

Looking at FIG. 11B, an expanded view of another embodiment of an outer wall assembly of a structure of this disclosure, generally 1150, is shown to an outer wall 1152 and a sealer layer 1154 and an inner wall assembly 1156 including studs 1158, an moisture and/or vapor barrier layer 1160, an insulating sheathing and/or drywall layer 1162 situated on a slab 1164. The wall assembly 1150 also includes ties 1166 anchoring the outer wall 1152 to the studs 1158 of the inner wall assembly 1156. The wall assembly 1150 also includes an air pathway 1168 disposed between the outer wall 1152 and the barrier layer 1160. The wall assembly 1150 also includes exhaust ports, holes, or channels 1170 through which conditioned air is exits the pathway 1168. The wall assembly 1156 also includes an wall air conduit 1172 for supplying conditioned air to the pathway 1168 and a treating solution reservoir 1174 disposed on a beam 1176, a treating solution treating dispensing unit 1178, a dispensing conduit 1180 ending in a nozzle 1182 for spraying the treating solution 1184 into the pathway 1168.

The wall assembly 1100 also includes wall temperature sensors 1186, moisture/water sensors 1188 and an air flow rate sensor 1190. The sensors and control valves are all controlled by a controller describe more fully in FIG. 13.

The wall assembly 1100 may also include a control valve 1192 associated with the channels 1170 so that the passageways or pathways 1168 may be pressurized or cut off from air flow. Thus, the passageways or pathways 1168 may be flooded with a fire retardant gas or foam and pressurized to help impede the spread of a fire.

Expanded Views of Interior Walls with Sensors and Dispensing Assemblies

Referring now to FIG. 12A, an expanded view of an embodiment of an inner wall assembly of a structure of this disclosure, generally 1200, is shown to include studs 1202, a first insulating sheathing and/or drywall layer 1204 and a second insulating sheathing and/or drywall layer 1206. The inner wall assembly 1200 also includes an air pathway 1208 disposed in a center 1210 of the assembly 1200. The assembly 1200 also includes a conditioner air conduit 1212 that supplies conditioned air into the pathway 1208 and an exhaust conduit 1214 that exhaust air, water, and/or moisture from the interior of the wall assembly 1200 disposed in a sub floor 1216 supported by support members 1218 on a slab 1220 and is vented out of the structure 1200 via an outlet 1222, where conditioned air flow is shown by the dark gray arrows. Of course, the pathway 1208 may require holes or other opening to be provided through the inner wall cross members (not shown) so that the conditioned is capable of reducing, decreasing, and/or eliminating water, moisture or mold accumulation in the wall assembly 1200 or facilitate drying the wall assembly 1200 after a water, moisture or mold event.

The wall assembly 1200 also includes wall temperature sensors 1224, moisture/water sensors 1226, and an air flow rate sensor 1228. The sensors and control valves are all controlled by a controller describe more fully in FIG. 13.

Looking at FIG. 12B, an expanded view of another embodiment of an inner wall assembly of a structure of this disclosure, generally 1250, is shown to include studs 1252, a first insulating sheathing and/or drywall layer 1254 and a second insulating sheathing and/or drywall layer 1256. The inner wall assembly 1250 also includes an air pathway 1258 disposed in a center 1260 of the assembly 1250. The assembly 1250 also includes a conditioner air conduit 1262 that supplies conditioned air into the pathway 1258 and an exhaust conduit 1264 that exhaust air, water, and/or moisture from the interior of the wall assembly 1250 disposed in a sub floor 1266 supported by support members 1268 on a slab 1270 and is vented out of the structure 1250 via an outlet 1272, where conditioned air flow is shown by the dark gray arrows. The assembly 1250 also includes a treating solution dispensing conduit 1274 ending in a nozzle 1276 for spraying a treating solution 1278 into the pathway 1258. The treating solution reservoir and dispensing mechanism are not shown, but may be as shown in FIG. 11B or of any other form used in the art to dispense a liquid, gas, or foam treating composition.

Of course, the pathway 1258 may require holes or other opening to be provided through the inner wall cross members (not shown) so that the conditioned air is capable of reducing, decreasing, and/or eliminating water, moisture or mold accumulation in the wall assembly 1250 or facilitate drying the wall assembly 1250 after a water, moisture or mold event.

The wall assembly 1250 also includes wall temperature sensors 1280, moisture/water sensors 1282, and an air flow rate sensor 1284. The sensors and control valves are all controlled by a controller describe more fully in FIG. 13.

The wall assembly 1200 may also include a control valve 1286 associated with the exhaust conduit 1264 so that the passageways or pathways 1258 may be pressurized or cut off from air flow. Thus, the passageways or pathways 1258 may be flooded with a fire retardant gas and pressurized to help impede the fire.

While FIGS. 11B and 12B demonstrate that introduction of compositions into the passageways to control pests, insects, molds, fungii, bacteria, and/or other pests, the compositions being dispensed may be fire suppressants and/or retardants that may be used to retard or impede the progression of fire through a structure.

Control System Embodiment

Referring now to FIG. 13, an embodiment of a control system, generally 1300, of a structure of this disclosure is shown to include a power supply 1302 (which may of course be the a power outlet in the structure or a dedicated power supply or power conditioning unit), a processor or processing unit 1304, one or a plurality of user interface or panel units 1306 including touch screen 1308 (or other interactive user interface), and optionally one or a plurality of remote control units 1310 (which may be a cell phone, a lap top, or desk top computer). The interface or panel units 1306 may be associated with each interior space or a plurality of interior spaces in communication with the processor 1304. By setting air properties in each of the interior spaces via the panels 1306, the air properties in each of the interior spaces or coupled interior spaces may be separately and independently controlled by the processor 1304. Additionally, air properties in each of the passageways may be entered into the panels 1306 communicated to the processor 1304 so that the air properties in each passageway may be independently and separately controlled. Of course, the processor 1304 may be programmed so that air properties in each of the interior spaces may be collectively controlled based on the number of people and heat generating equipment in each of the interior spaces. The processor 1304 include memory, communication hardware and software, and firmware or other software for controlling HVAC units, sensors, control valves, and dispensing units that dispense treating solutions. It should be recognized that passive air control valves are not be controlled by the processing unit 1304, but may be controlled by the air flow.

The power supply 1302 supplies power to the processor 1304, the interface 1306, an HVAC unit 1312, control values 1316, temperature sensors 1318, water/moisture sensors 1320, air flow sensors 1322, and treating units 1324 via power supply wires 1326. While I have disclosed using temperature sensors, water/moisture sensors, and air flow sensors, the systems of this invention may also include other sensors such as chemical sensors 1328 (e.g., carbon dioxide, carbon monoxide, mold, smoke, etc.) or other physical sensors 1330 (e.g., pressure, etc.) and any other sensors 1332 that may assist in reducing, removing, inhibiting and/or eliminating water, moisture, and/or mold or drying walls exposed to a water, moisture, and/or mold event.

The processor 1304 is in two way communication with the interface 1306, the remote control 1310, the HVAC unit 1312, the sensors 1318, 1320, 1322, 1328, 1330, and 1332, and the treating units 1324 via communication pathways 1334 (shown here as wires for the interface 1306, the HVAC unit 1312, the blower 1314, the sensors 1318, 1320, 1322, 1328, 1330, and 1332, and the treating units 1320 or a communication pathway 1336 (shown here as wireless for the remote control 1310). Of course, all of the communication pathways 1324 may also be wireless or a combination of wired and wireless communication pathways. Additionally, the interface 1306, the remote control 1310, the HVAC unit 1312, the blower 1314, the sensors 1316 and 1318 all include communication hardware and software for communication with the processor 1304, whether via wired or wireless communication pathways. Additionally, the remote control unit 1310 includes its own power supply, memory, processor, interface, touch screen or the like and human cognizable output devices such as speakers.

CLOSING PARAGRAPH OF THE DISCLOSURE

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

I claim:

1. A structure comprising:
   a floor;
   a roof;
   one or more exterior walls, each exterior wall including:
      an exterior wall air flow passageway including:
         one or more exterior wall air flow passageway inlets, and
         one or more exterior wall air flow passageway outlets;
   a plurality of interior walls;
   a plurality of interior spaces defined by the exterior and interior walls;
   an HVAC unit including:
      one or more HVAC inlet conduits, each of the one or more HVAC inlet conduits including:
         an HVAC inlet including:
            an HVAC inlet control valve configured to control a supply of unconditioned air or a mixture of unconditioned air and exhaust conditioned air to the HVAC unit;
      one or more HVAC exhaust conduits, each of the one or more HVAC exhaust conduits including:
         an HVAC exhaust inlet, and
         an HVAC exhaust outlet configured to support an air flow of the exhaust conditioned air out of the structure or to the HVAC inlet;
      one or more HVAC interior space outlet conduits, each of the one or more HVAC interior space outlet conduits including:
         an HVAC interior space outlet including:
            an HVAC interior space outlet control valve configured to control a supply of conditioned air to each of the interior spaces;
      one or more HVAC exterior wall conduits, each of the one or more HVAC exterior wall conduits including:
         an HVAC exterior wall outlet including:
            an HVAC exterior wall control valve configured to support an exterior wall passageway air flow of conditioned air to each of the exterior wall passageways,
   wherein the passageway air flow reduces, removes, and/or eliminates moisture in the exterior walls.

2. The structure of claim 1, wherein at least one of the exterior wall air flow passageway outlets including:
   a passive one-way or unidirectional valve or an active control valve to stop air or water flow into each of the exterior wall air flow passageway outlets.

3. The structure of claim 1, wherein each of the interior walls including:
   one or more interior wall air flow passageways, each of the one or more interior wall air flow passageways including:
      a interior wall air passageway inlet, and
      a interior wall air passageway outlet; and
   the HVAC unit further including:
      one or more HVAC interior wall conduits, each of the one or more HVAC interior wall conduits including:
         an HVAC interior wall outlet including:
            an HVAC interior wall control valve configured to support an interior wall passageway air flow of conditioned air to each of the interior wall passageways,
   wherein the interior air flows reduce, remove, and/or eliminate moisture in the interior walls.

4. The structure of claim 1, wherein each of the one or more exterior walls including:
   an outer surface including:
      an insulating layer;
   an inner surface including:
      an insulating layer.

5. The structure of claim 4, wherein each of the inner surface insulating layers including:
   a weather-resistant layer disposed on an outer surface of the insulating layer, a sheathing, or a combination thereof.

6. The structure of claim 5, wherein each of the inner surfaces of the exterior walls further including:
   a liquid barrier.

7. The structure of claim 4, wherein each of the outer surface insulating layers including:
a weather-resistant layer disposed on an outer surface of the insulating layer, a sheathing, or a combination thereof.

8. The structure of claim 1, wherein:
the at least one HVAC exhaust conduit further including:
a second HVAC exhaust outlet configure to support an air flow of exhaust conditioned air into the surrounding and having:
an HVAC exhaust control valve configured to control amounts of exhaust conditioned air exhausted into the surrounds.

9. The structure of claim 1, further comprising:
an air flow control system including:
a processing unit; and
plurality of sensors;
wherein one, some, or all of the control valves are active control valves,
wherein the processing unit is in communication with the active control valves, and
wherein the processing unit is configured to:
receive input from the sensors, and
control the HVAC unit, and
control the active control valves so that air flow rates are controlled into the interior spaces and into the passageways, and
during a 24 hour period of time, the processing unit is further configured to:
adjust the air flow into each of the interior spaces and into each passageway so that one or more interior space properties and/or one or more passageway properties are maintained at desired values.

10. The structure of claim 9, wherein the sensors comprise temperature sensors, water/moisture sensors, air flow sensors, chemical sensors, other physical sensors, and combinations thereof.

11. The structure of claim 9, wherein one or more of the sensors are disposed in the air flow passageways, in the interior spaces, or in both.

12. The structure of claim 9, wherein:
all of the control valves are active control valves, and
during a 24 hour period of time, the processing unit is further configured to:
adjust the air flow into each of the interior spaces and into each passageway so that one or more interior space properties and/or one or more passageway properties are maintained at desired values.

13. The structure of claim 12, wherein the one or more properties include moisture concentrations in the interior spaces, moisture concentrations in the passageways, temperatures in the interior spaces, temperatures in the passageways, pressures in the interior spaces, pressures in the passageways, air flow rates in the interior spaces, air flow rates in the passageways, sensed chemical concentrations in the interior spaces, sensed chemical concentrations in the passageways, microbial concentrations in the interior spaces, microbial concentrations in the passageways or mixtures and combinations thereof.

14. The structure of claim 1, further comprising:
a dispensing assembly associated with one, some, or all of the passageways and including:
a reservoir containing a treating composition;
a dispensing supply conduit having:
a dispensing assembly control value,
a dispensing head at its distal end,
wherein:
the dispensing assembly control value is configured to control an amount of treating solution or gas introduced into one, some, or all of the passageways,
the treating composition comprising a mold control composition, a pesticide, an insecticide, a fungicide, a bactericide, a rodent poison, other control compositions, a gas, a fire retardant compositions, a foam, or mixtures or combinations thereof;
the gas comprising nitrogen, nitrogen enriched air, argon, haloalkanes or mixtures thereof;
the haloalkanes comprising iodomethane; bromomethane, bromochloromethane, carbon tetrachloride, tribromofluoromethane, dichlorofluoromethane, bromodifluoromethane, dibromodifluoromethane, bromochlorodifluoromethane, dichlorodifluoromethane, bromotrifluoromethane, tetrafluoromethane, 1,2-dichlorotetrafluoroethane, dibromotetrafluoroethane, hexafluoroethane, or mixtures thereof.

15. A structure comprising:
a floor;
a roof;
one or more exterior walls, each exterior wall including:
an exterior wall air flow passageway including:
one or more exterior wall air flow passageway inlets, and
one or more exterior wall air flow passageway outlets, each of the exterior
wall air flow passageway outlets including:
a passive one-way or unidirectional valve or an active control valve to stop air or water flow into each of the exterior wall air flow passageway outlets;
a plurality of interior walls;
a plurality of interior spaces defined by the exterior walls and the interior walls;
an HVAC unit including:
one or more HVAC inlet conduits, each of the one or more HVAC inlet conduits including:
an HVAC inlet, and
an HVAC inlet active control valve configured to control a supply of unconditioned air or a mixture of unconditioned air and exhaust conditioned air to the HVAC unit;
one or more HVAC exhaust conduits, each of the one or more HVAC exhaust conduits including:
an HVAC exhaust inlet, and
an HVAC exhaust outlet configured to support an air flow of the exhaust conditioned air out of the structure;
one or more HVAC interior space outlet conduits, each of the one or more HVAC interior space outlet conduits including:
an HVAC interior space outlet, and
an HVAC interior space outlet active control valve configured to control a supply of conditioned air to each of the interior spaces;
one or more HVAC exterior wall conduits, each of the one or more HVAC exterior wall conduits including:
an HVAC exterior wall outlet, and
an HVAC exterior wall active control valve configured to support an exterior wall passageway air flow of conditioned air to each of the exterior wall passageways;

an air flow control system including:
a processing unit; and
plurality of sensors;
wherein the HVAC unit, the sensors, and the active control valves are in communication with and under the control of the processing unit, and
the processing unit is configured to:
receive input from the sensors,
control the HVAC unit, and
control the active control valves so that air flow rates are controlled into the interior spaces and into the passageways,
wherein the exterior wall air flows reduce, remove, and/or eliminate moisture in the one or more exterior walls.

16. The structure of claim 15, wherein the processing unit is further configured to:
adjust the air flow into each of the interior spaces and into each passageway, during a 24 hour period of time, so that one or more interior space properties and/or one or more passageway properties are maintained at desired values.

17. The structure of claim 15, wherein the sensors comprise temperature sensors, water/moisture sensors, air flow sensors, chemical sensors, other physical sensors, and combinations thereof.

18. The structure of claim 15, wherein one or more of the sensors are disposed in the air flow passageways, in the interior spaces, or in both.

19. The structure of claim 18, wherein the one or more properties include moisture concentrations in the interior spaces, moisture concentrations in the passageways, temperatures in the interior spaces, temperatures in the passageways, pressures in the interior spaces, pressures in the passageways, air flow rates in the interior spaces, air flow rates in the passageways, sensed chemical concentrations in the interior spaces, sensed chemical concentrations in the passageways, microbial concentrations in the interior spaces, microbial concentrations in the passageways or mixtures and combinations thereof.

20. The structure of claim 15, further comprising:
a dispensing assembly in communication with and under the control of the processing unit and associated with one, some, or all of the passageways and including:
a reservoir containing a treating composition;
a dispensing supply conduit having:
a dispensing assembly control value,
a dispensing head at its distal end,
wherein:
the dispensing assembly control value is configured to control an amount of treating solution or gas introduced into one, some, or all of the passageways,
the treating composition comprising a mold control composition, a pesticide, an insecticide, a fungicide, a bactericide, a rodent poison, other control compositions, a gas, a fire retardant compositions, a foam, or mixtures or combinations thereof;
the gas comprising nitrogen, nitrogen enriched air, argon, haloalkanes or mixtures thereof;
the haloalkanes comprising iodomethane; bromomethane, bromochloromethane, carbon tetrachloride, tribromofluoromethane, dichlorofluoromethane, bromodifluoromethane, dibromodifluoromethane, bromochlorodifluoromethane, dichlorodifluoromethane, bromotrifluoromethane, tetrafluoromethane, 1,2-dichlorotetrafluoroethane, dibromotetrafluoroethane, hexafluoroethane, or mixtures thereof.

21. A multistory structure comprising:
a plurality of stories, each of the stories including:
a floor,
a ceiling, and
a dead space disposed above the ceiling;
one or more exterior walls, each of the one or more exterior walls including:
an exterior wall air flow passageway; and
at least one exterior wall exhaust conduit;
a plurality of interior walls, each of the interior walls including:
an interior wall air flow passageway; and
at least one interior wall outlet conduit;
a plurality of interior spaces defined by the one or more exterior walls and interior walls;
an air handling system comprising:
an HVAC unit;
an HVAC inlet conduit including:
an HVAC surroundings inlet conduit having:
a surrounding inlet including:
a surrounding inlet active control valve configured to supply unconditioned air to the HVAC unit;
a return conditioned air conduit including:
a return conduit active control valve configured to control an amount of exhausted conditioned air to the HVAC unit;
a plurality of floor return conduits, each of the floor return conduits including:
an inlet disposed in the each of the floor dead spaces including:
a floor return conduit active control valve configured to control an amount of exhaust conditioned air supplied to the return conduit from each of the dead spaces;
a main HVAC outlet conduit including;
a plurality of floor outlet conduits, each of the floor outlet conduits including:
a floor outlet conduit active control valve configured to control an amount of conditioned air supplied to each of the floors;
a plurality of interior space outlet conduits, each of the interior space outlet conduits having:
a plurality of interior space outlets, each of the interior space outlets having an interior space outlet conduit active control valve configured to control an amount of conditioned air supplied to each of the interior space outlets;
one or more HVAC exhaust conduits, each of the one or more HVAC exhaust conduits including:
a HVAC exhaust conduit active control valve configured to control an amount of conditioned air exhausted to the surroundings; and
an air flow control system including:
a processing unit coupled to or associated with a plurality of sensors, the active control valves and the air handling system, wherein the sensors comprise temperature sensors, water/moisture sensors, air flow sensors, chemical sensors, other physical sensors, and combinations thereof;
one or more of the sensors is disposed in each of the interior spaces;
one or more of the sensors is disposed in the passageways;

wherein the processing unit is configured to:
receive input from the sensors; and
control the HVAC unit and the active control valves based on the sensor inputs to control unconditioned air flow rates into the HVAC, interior space air flow rates from the HVAC, return air flow rates into the HVAC, exhaust air flow rate to the surroundings, and passageway air flow rates through the passageways and into the surroundings.

22. The structure of claim 21, wherein each of the floor return conduits further including:
at least one return air active control valve configured to control an amount of the return conditioned air to the return conditioned air conduit.

23. The structure of claim 21, wherein, during a 24 hour period of time, the processing unit is further configured to:
adjust the air flow into each of the interior spaces and into each passageway based the received sensor input so that one or more interior space properties and/or one or more passageway properties are maintained at desired values.

24. The structure of claim 23, wherein the one or more properties include moisture concentrations in the interior spaces, moisture concentrations in the passageways, temperatures in the interior spaces, temperatures in the passageways, pressures in the interior spaces, pressures in the passageways, air flow rates in the interior spaces, air flow rates in the passageways, sensed chemical concentrations in the interior spaces, sensed chemical concentrations in the passageways, microbial concentrations in the interior spaces, microbial concentrations in the passageways or mixtures and combinations thereof.

25. The structure of claim 21, further comprising:
a dispensing assembly associated with one, some, or all of the passageways and including:
a reservoir containing a treating composition;
a dispensing supply conduit including:
a dispensing assembly control valve,
a dispensing head at its distal end,
wherein:
the dispensing assembly control valve is configured to control an amount of treating solution or gas introduced into one, some, or all of the passageways,
the treating composition comprising a mold control composition, a pesticide, an insecticide, a fungicide, a bactericide, a rodent poison, other control compositions, a gas, a fire retardant compositions, a foam, or mixtures or combinations thereof;
the gas comprising nitrogen, nitrogen enriched air, argon, haloalkanes, or mixtures thereof;
the haloalkanes comprising iodomethane; bromomethane, bromochloromethane, carbon tetrachloride, tribromofluoromethane, dichlorofluoromethane, bromodifluoromethane, dibromodifluoromethane, bromochlorodifluoromethane, dichlorodifluoromethane, bromotrifluoromethane, tetrafluoromethane, 1,2-dichlorotetrafluoroethane, dibromotetrafluoroethane, hexafluoroethane, or mixtures thereof.

* * * * *